US012685683B2

(12) United States Patent
Esteireiro

(10) Patent No.: US 12,685,683 B2
(45) Date of Patent: Jul. 21, 2026

(54) L-TRACK FITTING INCLUDING SAFETY LOCK VISUAL PIN

(71) Applicant: AMF-BRUNS GmbH & Co. KG, Apen (DE)

(72) Inventor: Jose C. Esteireiro, Cambridge (CA)

(73) Assignee: AMF-BRUNS GmbH & Co. KG, Apen (DE)

( * ) Notice: Subject to any disclaimer, the term of this patent is extended or adjusted under 35 U.S.C. 154(b) by 377 days.

(21) Appl. No.: 18/471,525

(22) Filed: Sep. 21, 2023

(65) Prior Publication Data

US 2024/0108520 A1 Apr. 4, 2024

Related U.S. Application Data

(60) Provisional application No. 63/376,875, filed on Sep. 23, 2022.

(51) Int. Cl.
*A61G 3/08* (2006.01)

(52) U.S. Cl.
CPC .................................. *A61G 3/0808* (2013.01)

(58) Field of Classification Search
CPC ...... B60N 2/245; B60N 2/01516; A61G 3/08; A61G 3/0808; B64D 11/0696; B60P 7/0815
See application file for complete search history.

(56) References Cited

U.S. PATENT DOCUMENTS 4,047,689 A 9/1977 Grendahl
7,665,939 B1 * 2/2010 Cardona ............... B60P 7/0815 410/11

(Continued)

FOREIGN PATENT DOCUMENTS

KR 10-2017-0032426 A 3/2017

OTHER PUBLICATIONS

Applicant has no Information to Disclose: No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

(Continued)

*Primary Examiner* — Nicholas McFall
*Assistant Examiner* — Eric Acosta
(74) *Attorney, Agent, or Firm* — Emerson, Thomson & Bennett, LLC; Daniel A. Thomson

(57) ABSTRACT

Provided in this disclosure is a fitting for engaging an L-track mounted to a surface and a connection component for connecting the fitting to an external component. The fitting includes a bottom portion including circular disks configured to be received within corresponding circular apertures formed in a surface of the L-track. The fitting is configured to slide along a longitudinal length of the L-track to enable the circular discs to be retained within a channel beneath opposing ledges formed in the surface of the L-track. A retractable lock mechanism is configured to retract along the fitting in a direction perpendicular to the longitudinal length, retracting between a locked position and an unlocked position. The retractable lock mechanism has circular engagement portions for engaging the circular apertures of the L-track when in the locked position, to thereby prevent the fitting from sliding along the longitudinal length.

17 Claims, 18 Drawing Sheets

(56) References Cited

U.S. PATENT DOCUMENTS

Figure 1A:
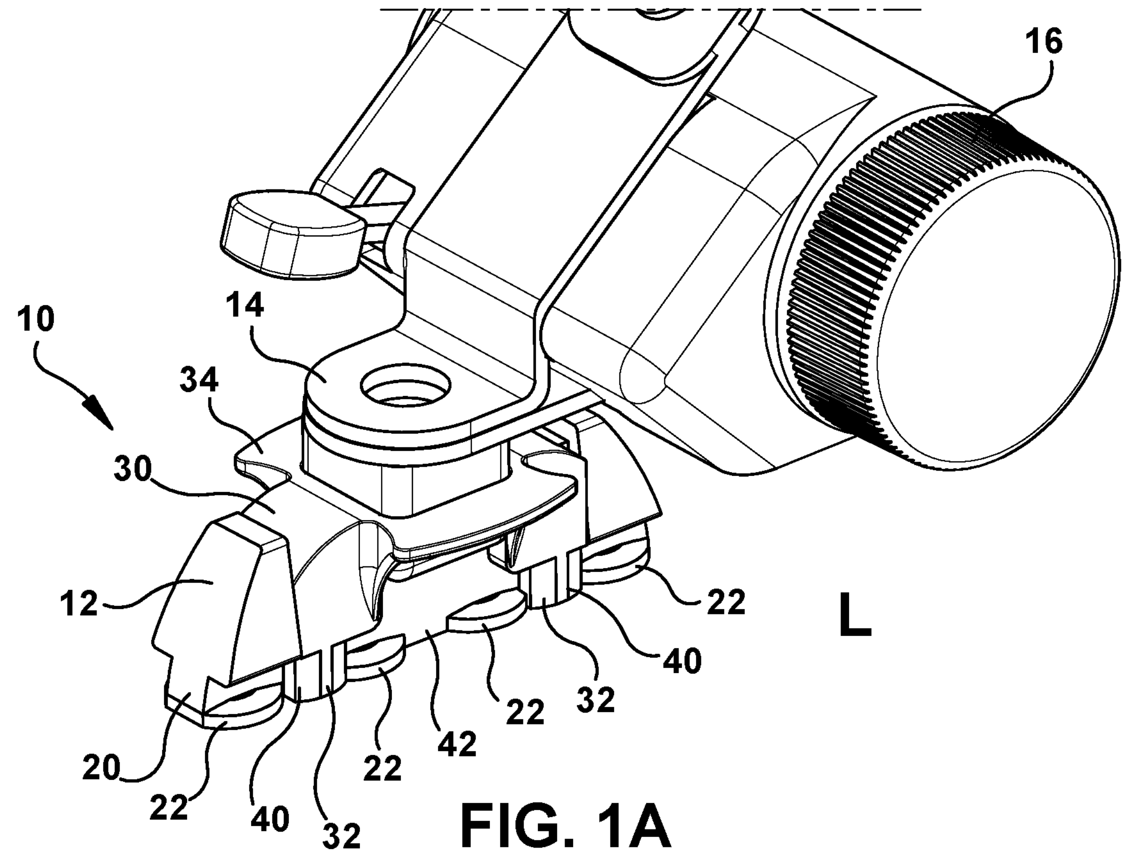
Figure 1B:
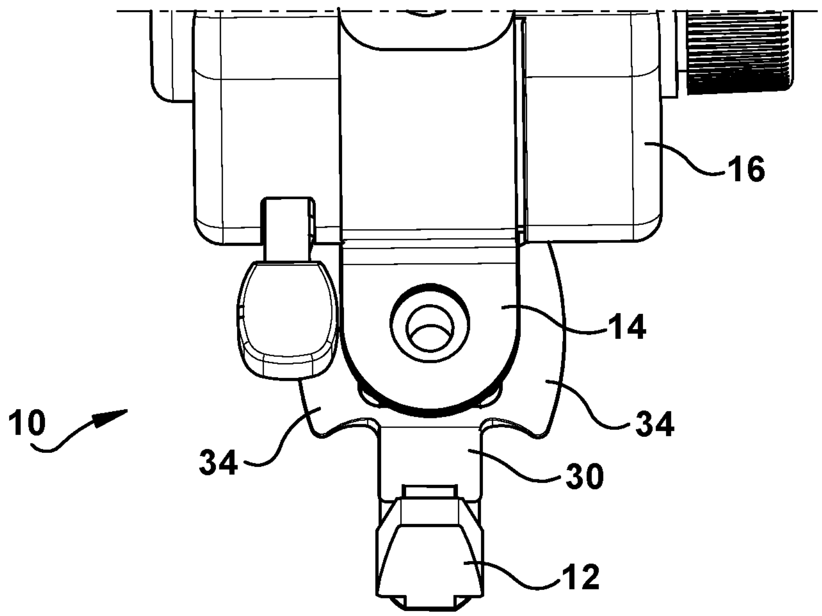
Figure 1C:
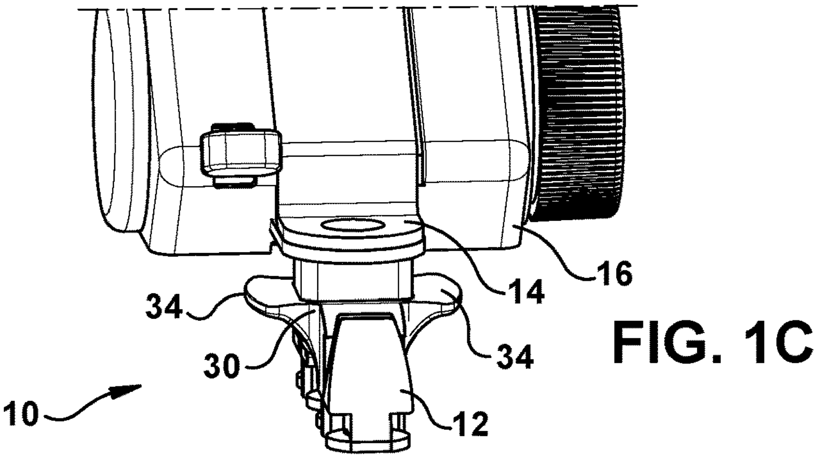
Figure 1D:
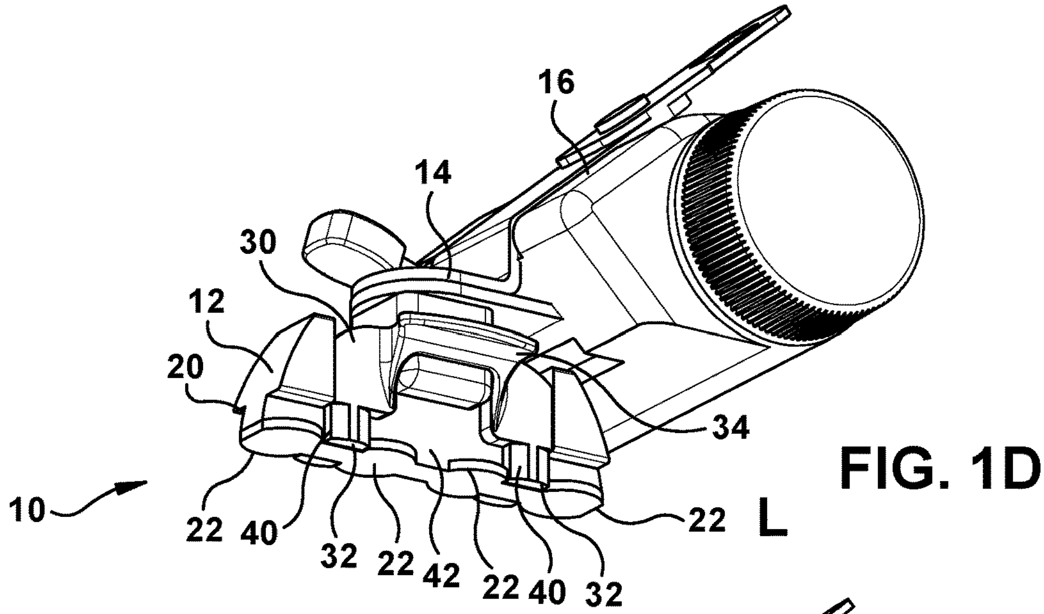
Figure 1E:
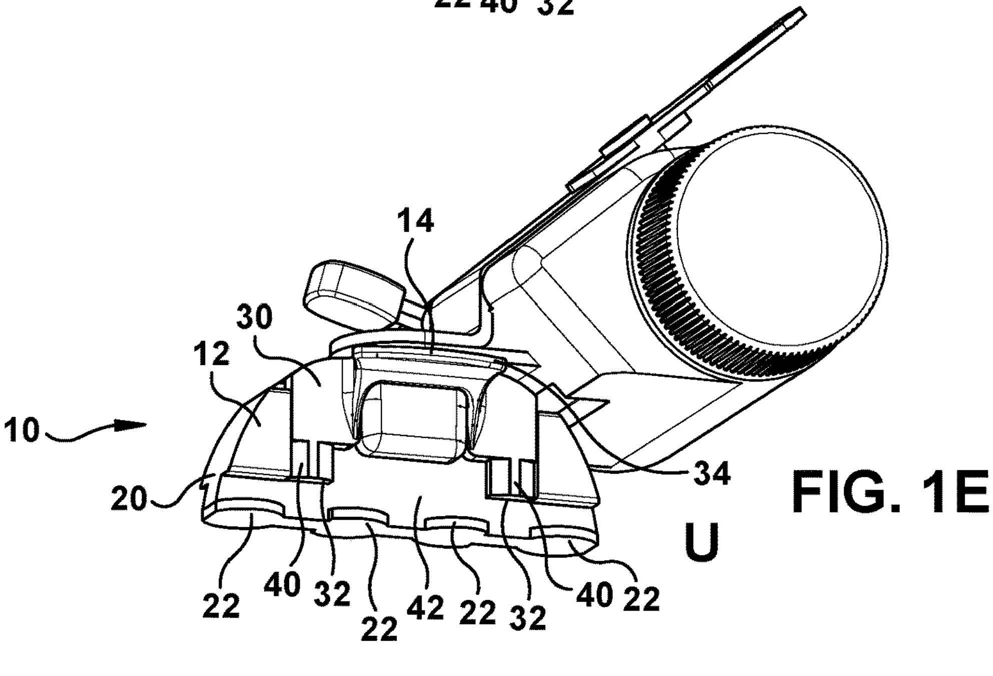
Figure 1F:
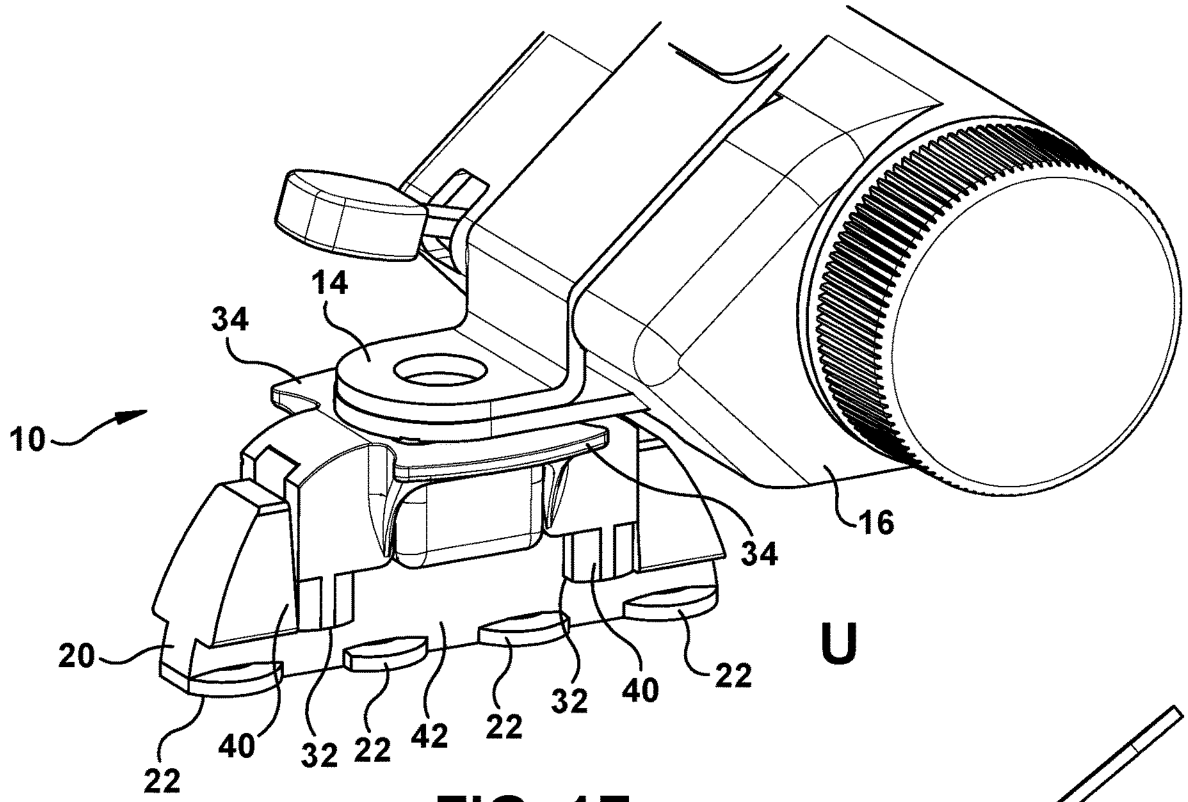
Figure 1G:
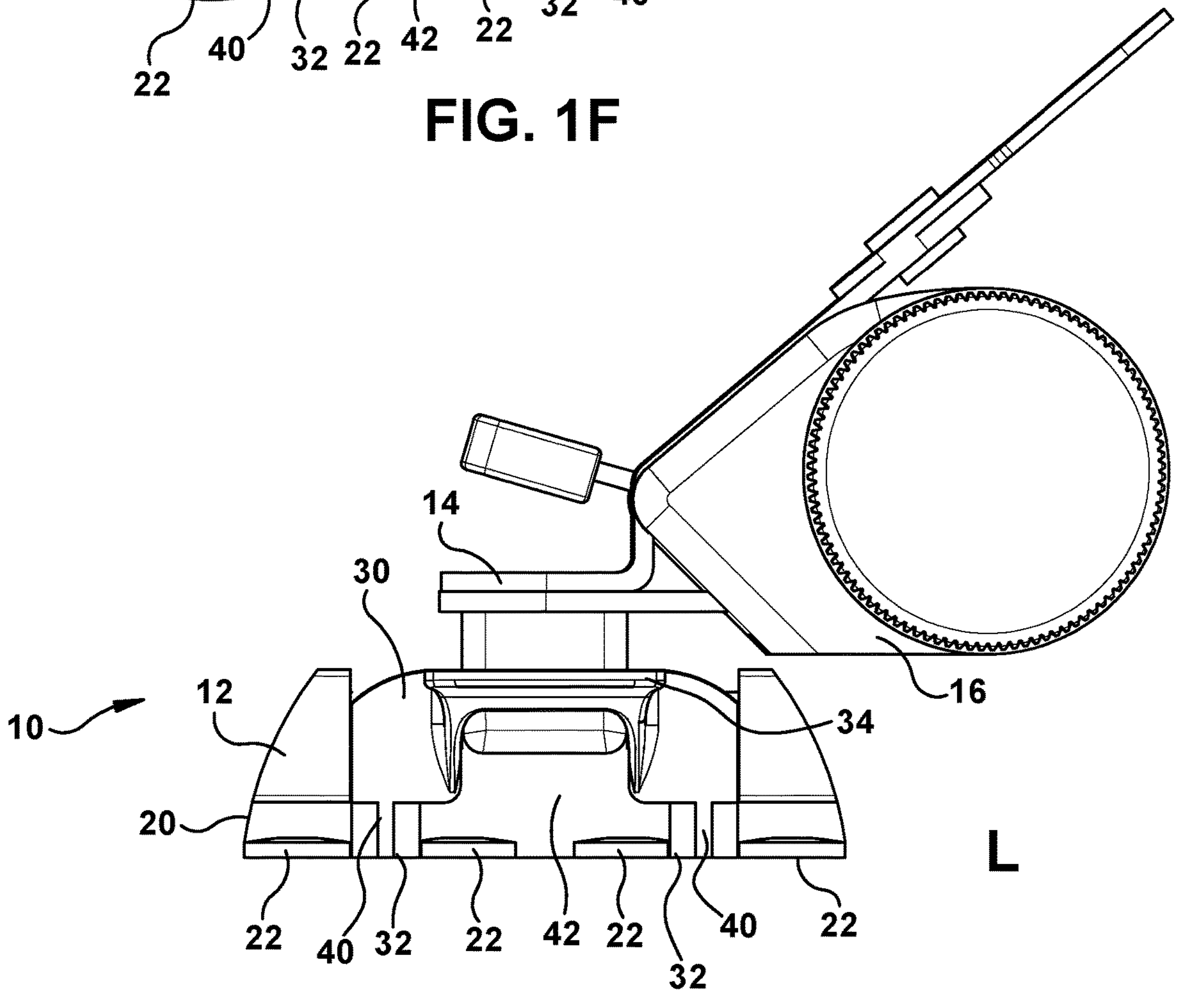
Figure 1H:
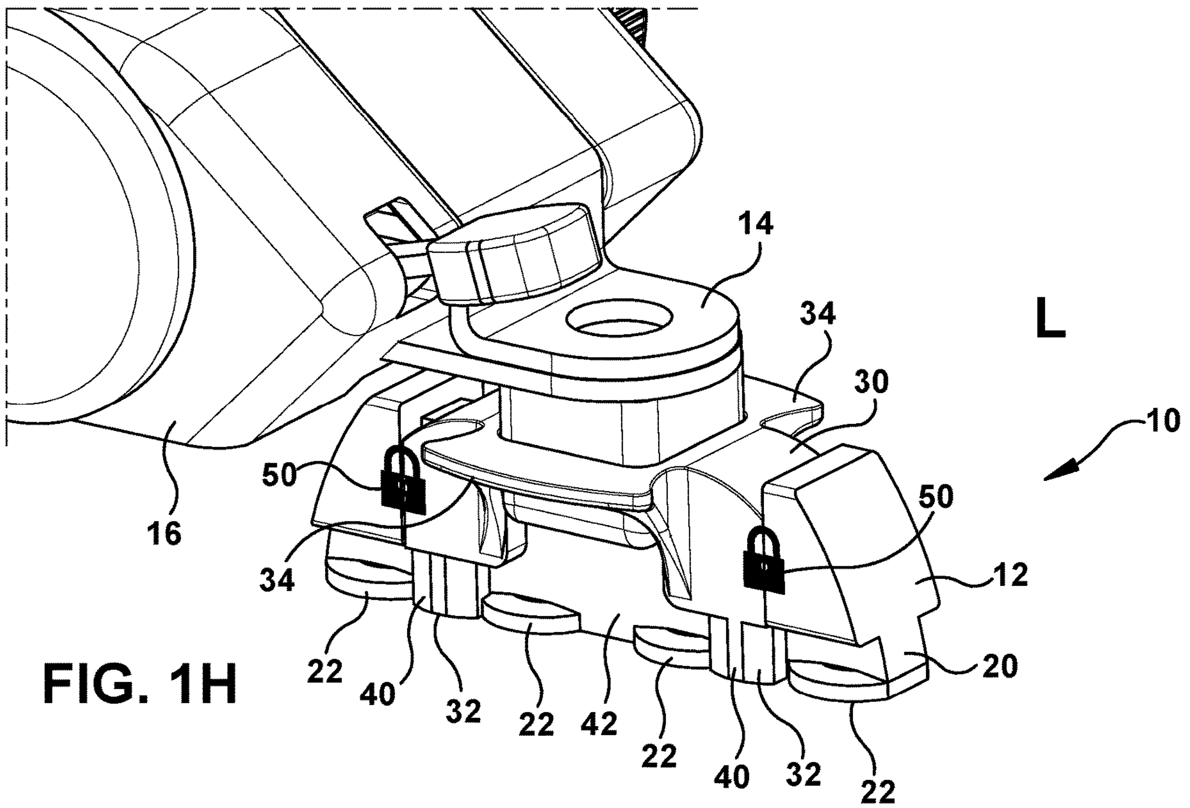
Figure 1I:
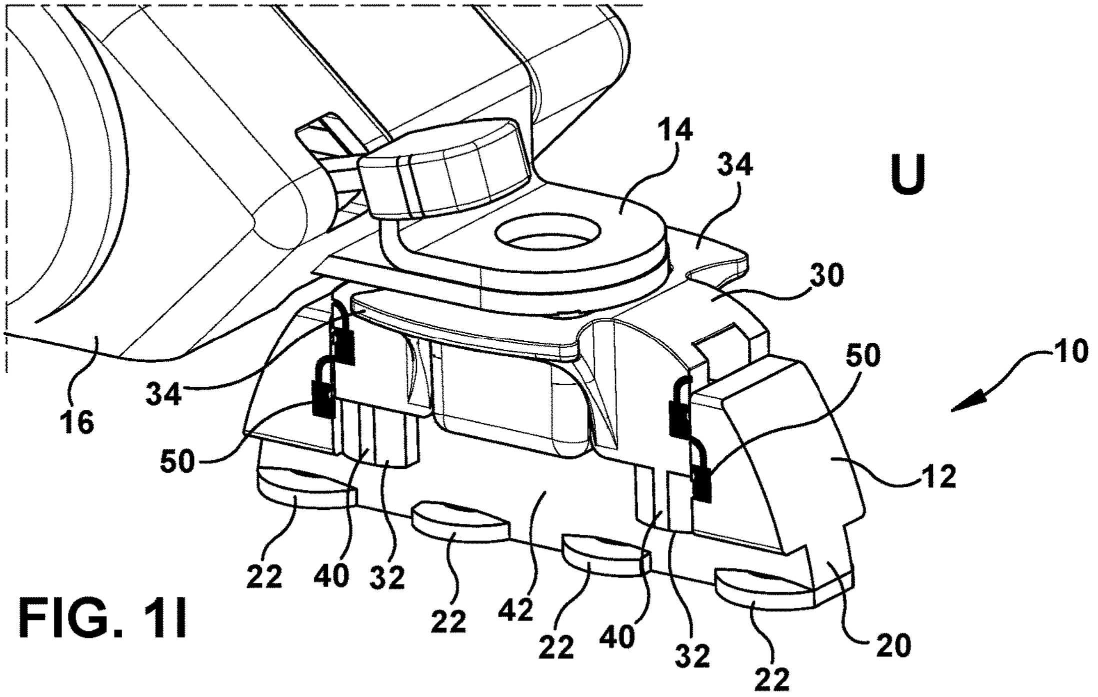
Figure 1J:
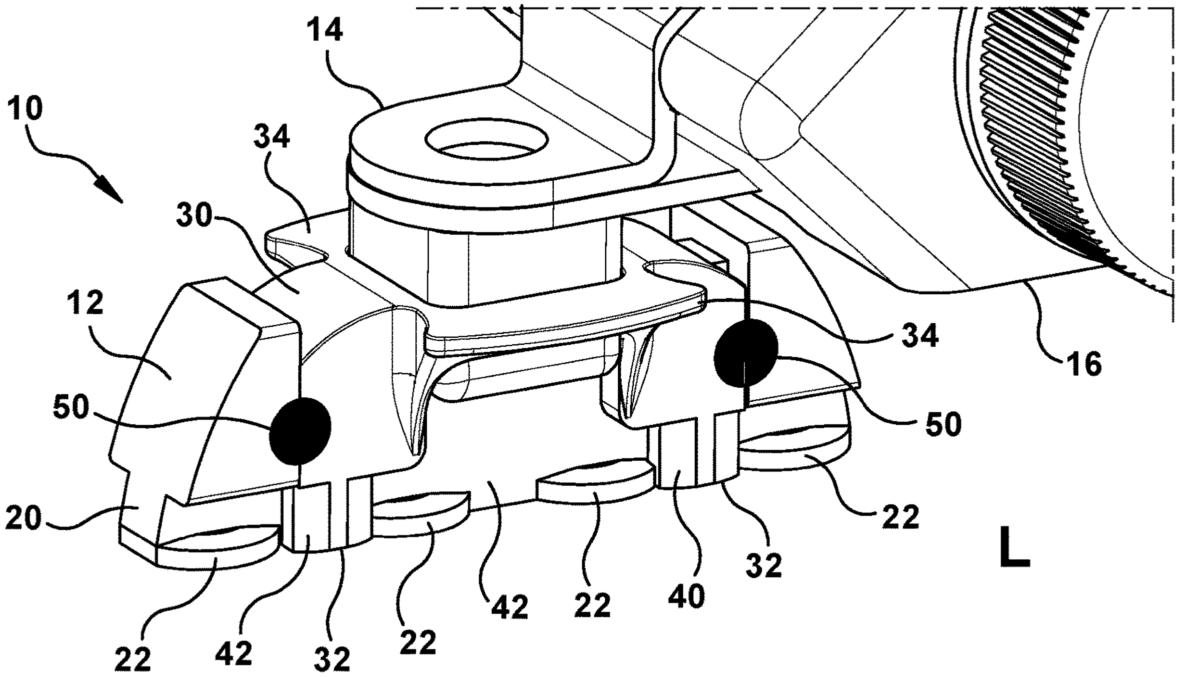
Figure 1K:
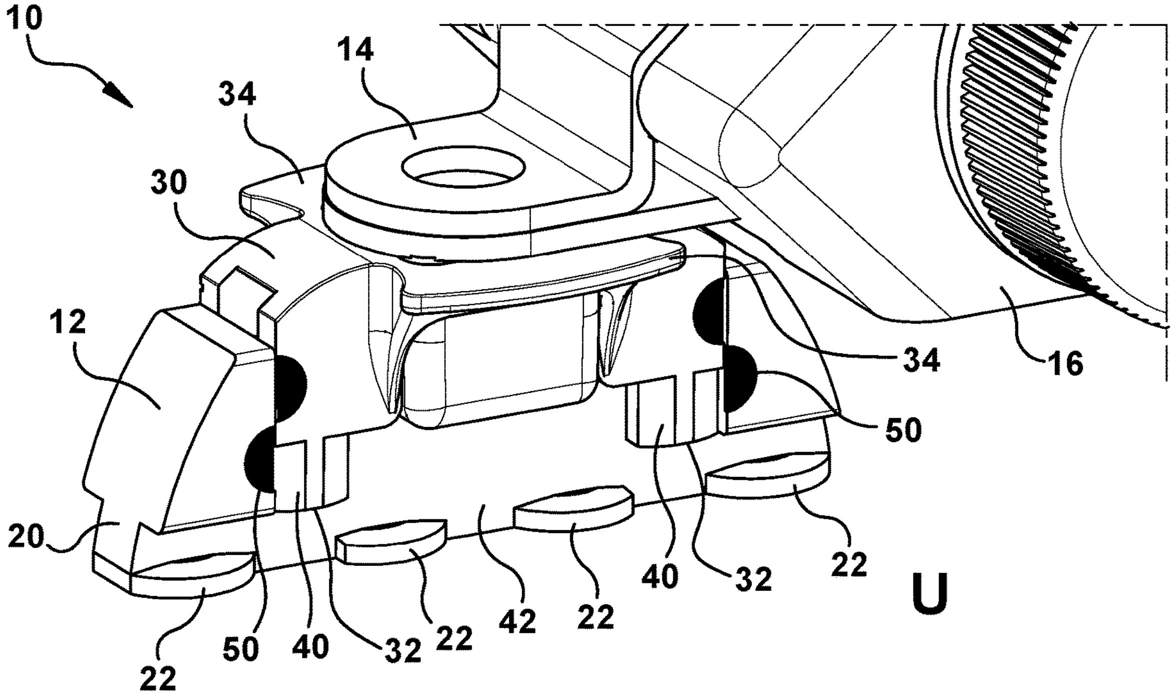

| | | | | |
|---|---|---|---|---|
| 2006/0104740 | A1 * | 5/2006 | Girardin | B60P 7/0815 410/105 |
| 2014/0271021 | A1 | 9/2014 | Cardona | |

OTHER PUBLICATIONS

Park, Tae Wook; Korean International Search Report; PCT/US2023/074766; dated Jan. 16, 2024; 5 pages.

Park, Tae Wook; Korean Written Opinion; PCT/US2023/074766; dated Jan. 16, 2024; 6 pages.

* cited by examiner

L-TRACK FITTING INCLUDING SAFETY LOCK VISUAL PIN

This application claims priority to a provisional patent application having Ser. No. 63/376,875, filed Sep. 23, 2022, the contents of which are hereby incorporated by reference. The present teaching pertains generally to the field of securing loads in vehicles such as automobiles, buses, etc. The present teaching pertains specifically to the field of safely securing a wheelchair to a passenger transport vehicle such as a van in a sufficient manner to ensure the safety of the wheelchair occupant.

I. BACKGROUND

Transport vehicles for persons with disabilities typically include safety structures for securing wheelchairs to the floor and/or sides of the vehicle. Such passenger transport vehicles commonly use wheelchair restraining structures mounted to the floor of the vehicle with series L logistic track. Such L-tracks are typically used in many floor anchoring applications including the aircraft industry, and also for anchoring motorcycles, snowmobiles, or ATVs in trailers. L-tracks are lightweight, strong and durable tracks manufactured from high strength aluminum, and are bolted to the floor of the vehicle.

Safety structures for wheelchair vehicular transport can include a retractor which is secured to a retractable tensioning strap that can be mounted to the wall of the vehicle, to securely engage and retain the wheelchair against movement. The retractor is configured to removably engage an L-track mounted to the floor of the vehicle (i.e., a passenger van).

There are certain problems with existing vehicle mounted retractors. Space is at a premium in passenger vehicles for wheelchair occupants, especially for smaller vehicles or standard-sized vehicles transporting larger wheelchairs. While reducing size of a retractor can conserve space, this results in a tradeoff of compromising the strength of the retractor, thereby reducing safety.

II. SUMMARY

Provided in this disclosure is a fitting assembly including a fitting for engaging an L-track mounted to a surface and a connection component for connecting the fitting to an external component. The fitting includes a bottom portion having a row of circular disks configured to be received within a corresponding row of circular apertures formed in a surface of the L-track. The fitting is configured to slide along a longitudinal length of the L-track to enable the circular discs to be retained within a channel beneath opposing ledges formed in the surface of the L-track. The fitting also includes a retractable lock mechanism configured to retract along the fitting in a direction perpendicular to the longitudinal length, retracting between a locked position and an unlocked position. The fitting has circular engagement portions for engaging the circular apertures of the L-track when in the locked position, to thereby prevent the fitting from sliding along the longitudinal length.

In one aspect of the present innovative concept, the retractable lock mechanism of the fitting assembly also includes one or more tabs projecting from one or more sides of the retractable lock mechanism, to enable manual gripping of the retractable lock mechanism for retracting between the locked position and the unlocked position.

In another aspect of the present innovative concept, the retractable lock mechanism of the fitting assembly also includes cylindrical members configured to retractably move inside cylindrical bores formed within the fitting. The circular engagement portions are formed at respective bottom ends of the cylindrical members. In an exemplary embodiment, the retractable lock mechanism is defined by a solid top portion with a pair of the cylindrical members connected thereto, which extend moveably into a respective pair of the cylindrical bores.

In still another aspect of the present innovative concept, the retractable lock mechanism also includes partial cylindrical members having hollow central portions configured to retractably move outside a flat central body portion of the fitting. The circular engagement portions are partial circular sections formed at respective bottom ends of the partial cylindrical members. In one aspect, the retractable lock mechanism is defined by a solid top portion with a pair of bifurcated partial cylindrical members connected thereto, which extend moveably along an outside surface of the flat central body portion.

In yet another aspect, the fitting assembly includes a safety lock visual indicator for visibly indicating whether the retractable lock mechanism is in the locked position or the unlocked position. In one exemplary embodiment, the safety lock visual indicator can be visible indicia partially formed onto sections of both the fitting and the retractable lock mechanism. When in the locked position, the visual indicia of both sections are in alignment to appear as complete and continuous visual indicia. When in the unlocked position, the visual indicia of both sections are out of alignment to appear as incomplete and discontinuous visual indicia.

In another aspect, the safety lock visual indicator can be a visual pin having a first color and is received within an internal chamber of the retractable lock mechanism having a second color. The visual pin extends above an exterior surface of the retractable lock mechanism to reveal the first color and thereby indicate either the locked position or the unlocked position. The visual pin is alternately recessed below the exterior surface of the retractable lock mechanism within the internal chamber to reveal the second color of the internal chamber and thereby indicate the respective other of the locked position or unlocked position.

In one aspect the first color is red, and the second color is green. In this instance, the visual pin is configured to extend above the exterior surface of the retractable lock mechanism to reveal red color and thereby indicate the unlocked position. Alternately, the visual pin can be recessed below the exterior surface of the retractable lock mechanism to reveal green color within the internal chamber and thereby indicate the locked position.

In another exemplary embodiment, the first color is green, and the second color is red. In this instance, the visual pin is configured to extend above the exterior surface of the retractable lock mechanism to reveal green color and thereby indicate the locked position. Alternately, the visual pin can be recessed below the exterior surface of the retractable lock mechanism to reveal red color within the internal chamber and thereby indicate the unlocked position.

In a further aspect, the connection component includes a pivotal connection configured to enable pivotal rotation of the fitting along at least one axis perpendicular to the longitudinal length. In one exemplary embodiment, the pivotal connection is configured to enable pivotal rotation of the fitting along an axis transversely perpendicular to the longitudinal length. In another exemplary embodiment, the pivotal connection is configured to enable pivotal rotation of the fitting along an axis vertically perpendicular to the longitudinal length.

In another further aspect, the external component is a retractor body configured for attachment to a retractable member, for securing a wheelchair against movement inside a passenger vehicle. In this manner, an exemplary embodiment is contemplated of a retractor assembly for retaining a wheelchair in a passenger vehicle in which a retractor body is configured for attachment to a retractable member mounted onto a surface of the passenger vehicle. The retractable member is configured for securing the wheelchair against movement inside the passenger vehicle. A fitting is provided for engaging an L-track mounted to a floor surface of the passenger vehicle. A pivotal connection pivotally connects the retractor body to the fitting. The fitting includes a bottom portion having a row of circular disks configured to be received within a corresponding row of circular apertures formed in a surface of the L-track. The fitting is configured to slide along a longitudinal length of the L-track to enable the circular discs to be retained within a channel beneath opposing ledges formed in the surface of the L-track. A retractable lock mechanism is configured to retract along the fitting in a direction perpendicular to the longitudinal length, retracting between a locked position and an unlocked position, and having circular engagement portions for engaging the circular apertures of the L-track when in the locked position, to thereby prevent the fitting from sliding along the longitudinal length.

The present fitting assembly can generally provide a connector for any sort of anchoring application with logistic track (L-track) for use with the aircraft industry, or for any application for anchoring motorcycles, snowmobiles, or ATVs in trailers.

The present fitting assembly can specifically provide a safety structure cooperating with an L-track for wheelchair vehicular transport that can be used with a retractor mounted to the wall of the vehicle, to securely engage and retain the wheelchair against movement.

The present fitting assembly can enable reducing the size of a retractor to conserves space without compromising the strength of the retractor, thereby ensuring safety.

Other benefits and advantages of the present teaching will become apparent to those skilled in the art to which it pertains upon reading and understanding of the following detailed specification.

III. BRIEF DESCRIPTION OF THE DRAWINGS

The disclosed fitting assembly may take physical form in certain parts and arrangement of parts, aspects of which will be described in detail in this specification and illustrated in the accompanying drawings which form a part hereof.

FIGS. 1A, 1B, 1C, 1D, 1E, 1F, 1G, 1H, 1I, 1J, and 1K are various views depicting a first model of a fitting assembly in accordance with the present innovative concept.

FIGS. 2A, 2B, 2C, 2D, 2E, 2F, 2G, 2H, and 2I are various views depicting a second model of a fitting assembly in accordance with the present innovative concept.

FIGS. 3A, 3B, 3C, and 3D are various views depicting a third model of a fitting assembly in accordance with the present innovative concept.

FIGS. 4A, 4B, 4C, 4D, 4E, 4F, 4G, 4H, 4I, 4J, 4K and 4L are various views depicting a fourth model of a fitting assembly in accordance with the present innovative concept.

IV. DETAILED DESCRIPTION

Referring now to the drawings wherein the showings are for purposes of illustrating aspects of the article only and not for purposes of limiting the same, and wherein like reference numerals are understood to refer to like components:

FIGS. 1A through 4L all generally depict a fitting assembly 10 in accordance with the present aspects. The fitting assembly 10 includes a fitting 12 for engaging an L-track 10A mounted to a surface. An L-track 10A is particularly shown in the embodiments depicted in FIGS. 3A, 3D, 4F, 4H and 4I, but it is to be appreciated that all of the embodiments disclosed herewith have similar structures for similarly engaging with an L-track 10A.

With continued general reference to FIGS. 1A through 4L, the fitting assembly 10 includes a connection component 14 for connecting the fitting 12 to an external component 16. In one aspect the external component 16 is a retractor body configured for attachment to a retractable member such as a spring-loaded retractable strap, for securing a wheelchair against movement inside a passenger vehicle. However, it is to be appreciated that the external component 16 can be any suitable component that can be attached to an L-track 10A without departing from the present innovative concept.

With ongoing general reference to FIGS. 1A through 4L, the fitting 12 includes a bottom portion 20 which in turn is formed with a row of circular disks 22 configured to be received within a corresponding row of circular apertures 12A formed in a line on a surface 14A of the L-track 10A. As indicated in FIGS. 3A, 3D, 4F, 4H, and 4I, the general configuration of the L-track 10A includes a line of circular apertures 12A that are connected by open gaps 12Ax that can admit movement of a component (such as the present fitting 12) along a horizontal longitudinal length 24 of the L-track 10A. The configuration of the L-track 10A also includes a channel 16A formed beneath a surface 14A which defines opposing ledges 18A separated by the open gaps 12Ax between the circular apertures 12A.

With further general reference to FIGS. 1A through 4L, in an exemplary embodiment, a row of four (4) circular discs 22 are a provided that are matingly received within a corresponding row of four (4) circular apertures 12A in an L-track 10A. After the circular discs 22 are received within the circular apertures 12A of the L-track 10A, the fitting 12 can slide along the horizontal longitudinal length 24 of the L-track 10A. The bottom portion 20 of the fitting 12 has a narrower width than the diameter of the circular discs 22 so that it can move freely within the open gaps 12Ax and pass between the opposing ledges 18A. However, when the fitting 12 is displaced one-half of the diameter of the circular discs 22, the wider diameter of the circular discs 22 enables them to be securely retained underneath the opposing ledges 18A while the bottom portion 20 is received within the gaps 12Ax between the opposing ledges 18A. In this manner, the opposing ledges 18A securely retain the circular discs 22 within the channel 16A when the fitting 12 is offset along the L-track 12A by one-half diameter from alignment of the circular discs 22 with the circular apertures 12A.

With additional general reference to FIGS. 1A through 4L, a retractable lock mechanism 30 is configured to retract along the fitting 12 in a vertical direction 26 perpendicular to the longitudinal length 24, retracting between a locked position L and an unlocked position U, The retractable lock mechanism 30 includes circular engagement portions 32 for engaging the circular apertures 12A of the L-track 10A when in the locked position L, to thereby prevent the fitting 12 from sliding along the longitudinal length 24 of the L-track 10A.

The locked position L is particularly shown in FIGS. 1A, 1D, 1G, 1H, 1J, 2E, 2F, 2G, 2H, 3A, 3B, 3C, 3D, 4A, 4C, 4D, 4E, 4F, 4G, 4H, 4I, and 4K in which the retractable lock mechanism 30 is lowered along the fitting 12 so that the circular engagement portions 32 are flush and aligned with the circular discs 22. The circular engagement portions 32 have the same diameter as the circular discs 22 and are offset from the circular discs 22 by one-half diameter so that the circular engagement portions 32 are engaged with the L-track 10A, thereby preventing horizontal movement along the longitudinal length 24. In this manner, the circular engagement portions 32 retain the circular discs 22 underneath the opposing ledges 18A and prevent the fitting 12 from disengaging from the L-track 10A, thereby locking the fitting 12 while in the locked position.

The unlocked position U is particularly shown in FIGS. 1E, 1F, 1I, 1K, 2C, 2D, 2I, 4J, and 4L in which the retractable lock mechanism 30 is raised along the fitting 12 so that the circular engagement portions 32 are out of alignment with the circular discs 22. The circular engagement portions 32 are thus not engaged with the L-track 10A, thereby permitting horizontal movement along the longitudinal length 24. In this manner, the circular discs 22 are able to move out from underneath the opposing ledges 18A and thereby enable the fitting 12 to disengage from the L-track 10A, thus unlocking the fitting 12 while in the unlocked position.

With general reference to FIGS. 1A through 3D, depicting the embodiments of the first, second, and third models, the retractable lock mechanism 30 additionally includes tabs 34 projecting from the sides of the retractable lock mechanism 30, to enable manual gripping of the retractable lock mechanism for retracting between the locked position L and the unlocked position U. The tabs 34 can be gripped by the fingers of a user who can raise the retractable lock mechanism 30 so as to move the circular engagement portions 32 out of engagement to the unlocked position U, and alternately lower the retractable lock mechanism 30 so as to move the circular engagement portions 32 into engagement to the locked position L.

FIGS. 1A, 1B, 1C, 1D, 1E, 1F, 1G, 1H, 1I, 1J, and 1K specifically depict a fitting assembly 10 in accordance with a first model embodiment. In this embodiment, the retractable lock mechanism 30 is configured to include partial cylindrical members 40 having hollow central portions configured to retractably move outside a flat central body portion 42 of the fitting 12. The flat central body portion 42 is of the same width as the bottom portion 20 of the fitting 12 and defines a continuous surface. In the embodiment of the first model, the retractable lock mechanism 30 is configured to be a solid top portion connected to the partial cylindrical members 40, which are configured to be a pair of bifurcated partial cylindrical members connected thereto, which extend moveably along an outside surface of the flat central body portion 42. In the aspect of the first model, the circular engagement portions 32 are partial circular sections formed at respective bottom ends of the partial cylindrical members 40. When in the locked position L, the partial circular sections of the circular engagement portions 32 are flush and aligned with the circular discs 22 and a lower surface of the bottom portion 20.

FIGS. 2A, 2B, 2C, 2D, 2E, 2F, 2G, 2H, and 2I specifically depict a fitting assembly 10 in accordance with a second model while FIGS. 3A, 3B, 3C, and 3D specifically depict a fitting assembly 10 in accordance with a third model. In both models, the retractable lock mechanism 30 includes cylindrical members 44 configured to retractably move inside cylindrical bores formed within the fitting 12. In these aspects, the circular engagement portions 32 are formed at respective bottom ends of the cylindrical members 44. The bottom portion 20 of the fitting 12 is discontinuous and includes void areas to allow the cylindrical members 44 to pass through. Some of the circular discs 22 are notched so as to allow the cylindrical members 44 to pass through. In the second and third models, the retractable lock mechanism 30 is configured to be a solid top portion connected to the cylindrical members 44, which are configured to be a pair of cylindrical members 44 connected thereto, which extend moveably into a respective pair of the cylindrical bores. In the second and third models, the circular engagement portions 32 are circular sections formed at respective bottom ends of the pair of cylindrical members 40 and pass through the notched circular discs 22. When in the locked position L, the circular sections of the circular engagement portions 32 are flush and aligned with the circular discs 22.

With general reference to FIGS. 1A through 4L, the fitting assembly 10 includes a safety lock visual indicator 50 for visibly indicating whether the retractable lock mechanism 30 is in the locked position L or the unlocked position U. With specific reference to FIGS. 1H, 1I, 1J, and 1K, the first model includes a safety lock visual indicator 50 in which visible indicia are partially formed onto sections of both the fitting 12 and the retractable lock mechanism 30. When in the locked position L, the visual indicia 50 of both sections are in alignment to appear as complete and continuous visual indicia. When in the unlocked position U, the visual indicia 50 of both sections are out of alignment to appear as incomplete and discontinuous visual indicia. As shown in the aforementioned figures, the visual indicia 50 can be an image of a padlock or a circle or any other suitable image to convey the impression to the user of whether the fitting assembly 10 is locked or unlocked.

With general reference to FIGS. 2H and 2I and FIGS. 4G, 4H, 4I, 4J, 4K, and 4L, respectively depicting alternate aspects of the second and fourth models, the safety lock visual indicator is a visual pin 50 having a first color and is received within an internal chamber 52 of the retractable lock mechanism 30 having a second color. The visual pin 50 extends above an exterior surface of the retractable lock mechanism 30 to reveal the first color and thereby indicate one of the locked position L or unlocked position U. Conversely, the visual pin 50 is alternately recessed below the exterior surface of the retractable lock mechanism 30 within the internal chamber 52 to reveal the second color of the internal chamber 52 and thereby indicate the respective other of the locked position L or unlocked position U.

Figure 2A:
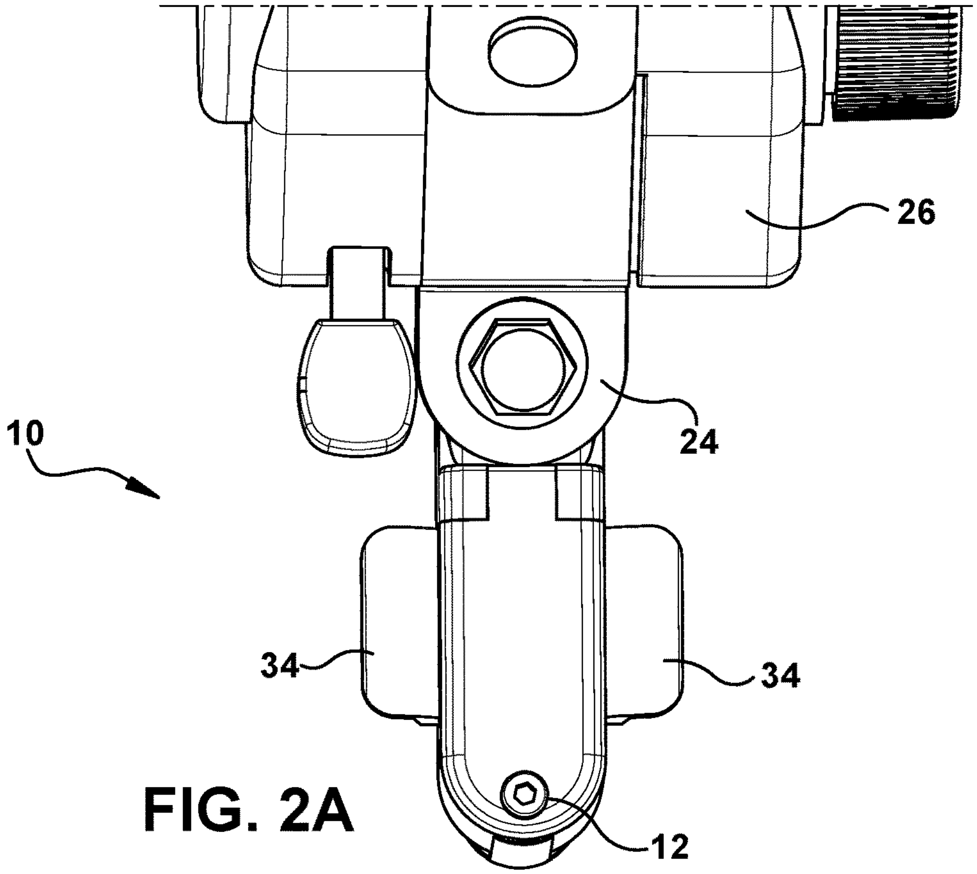
Figure 2B:
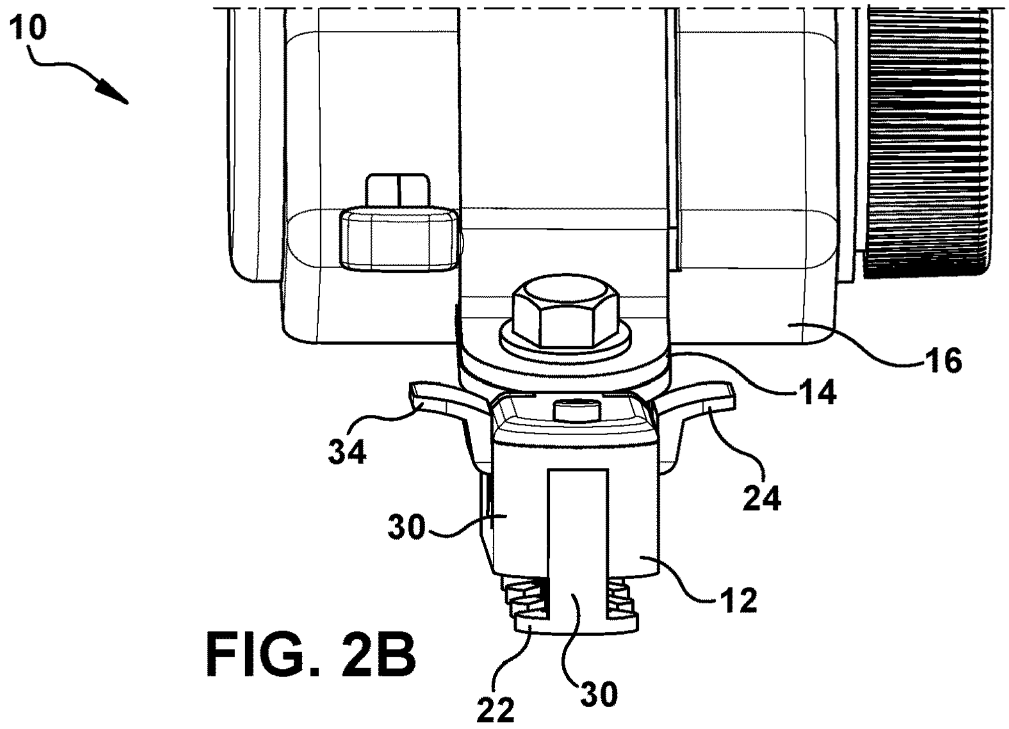
Figure 2C:
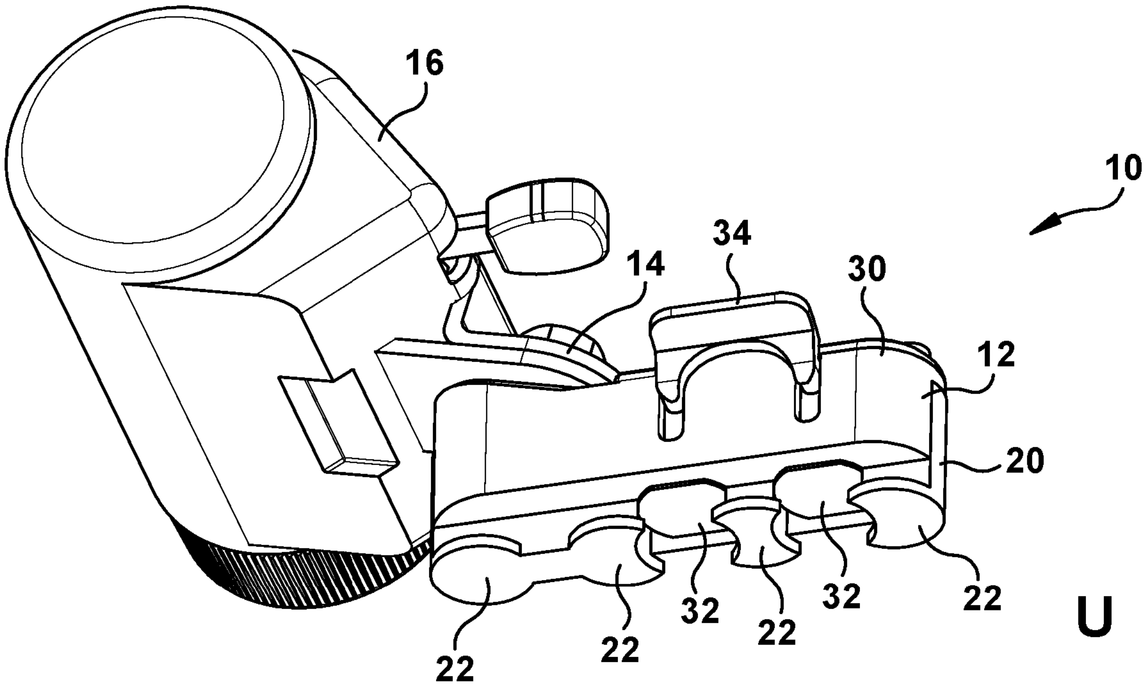
Figure 2D:
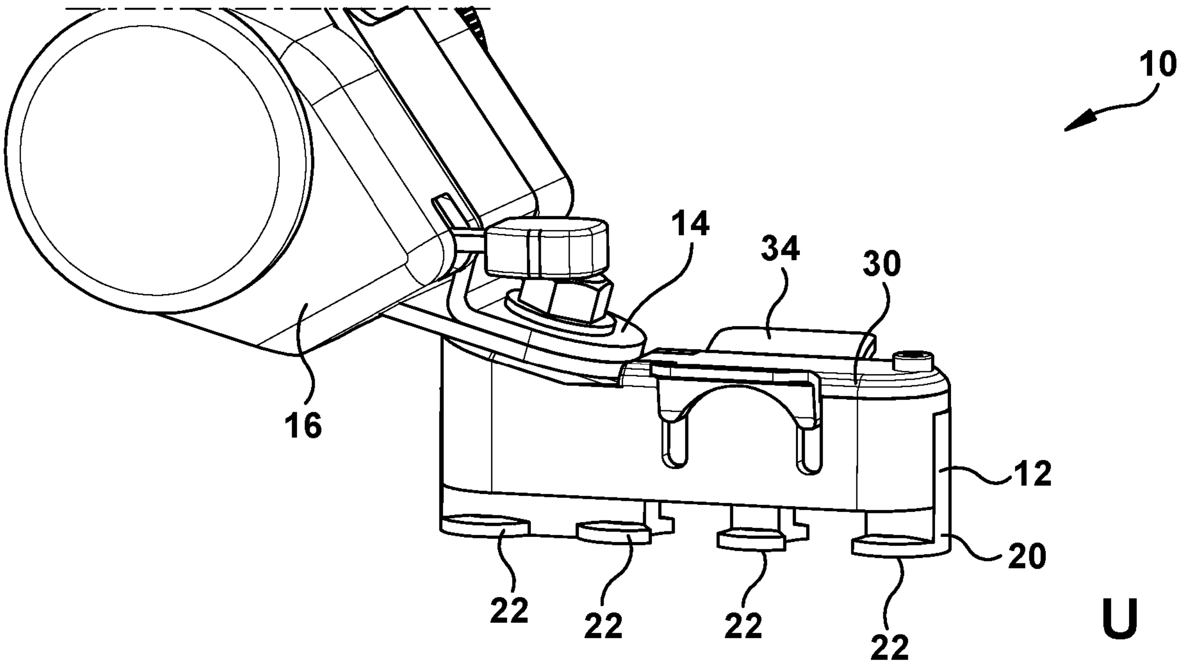
Figure 2E:
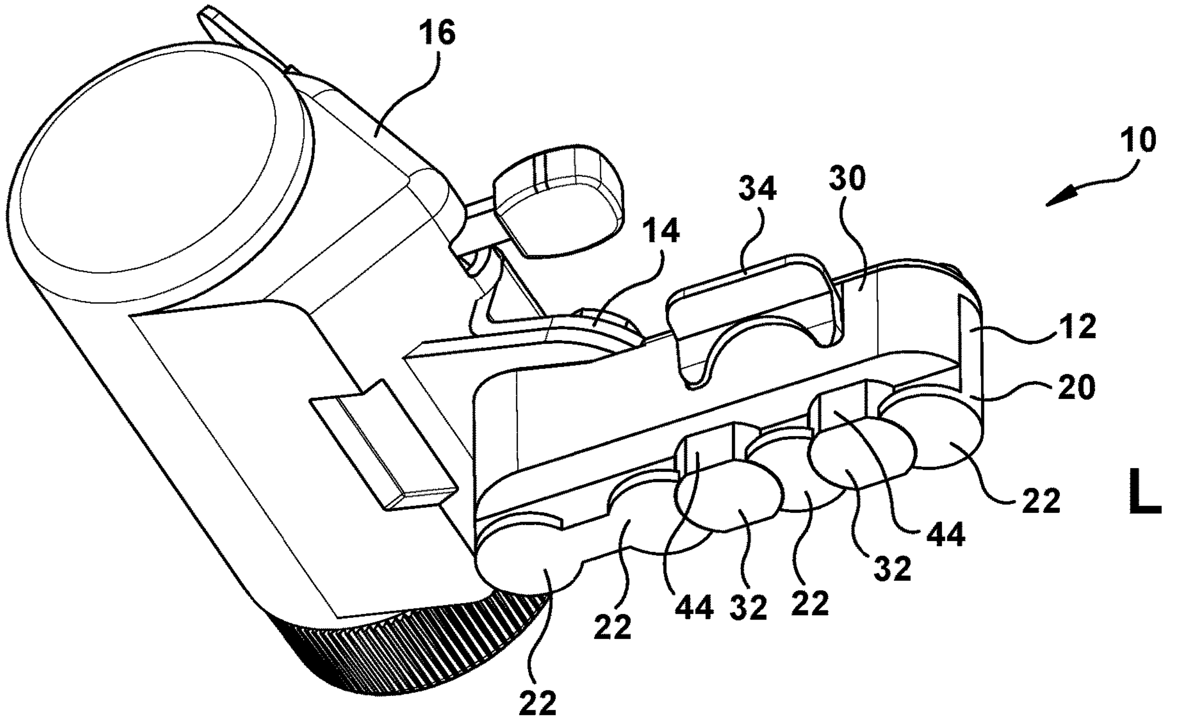
Figure 2F:
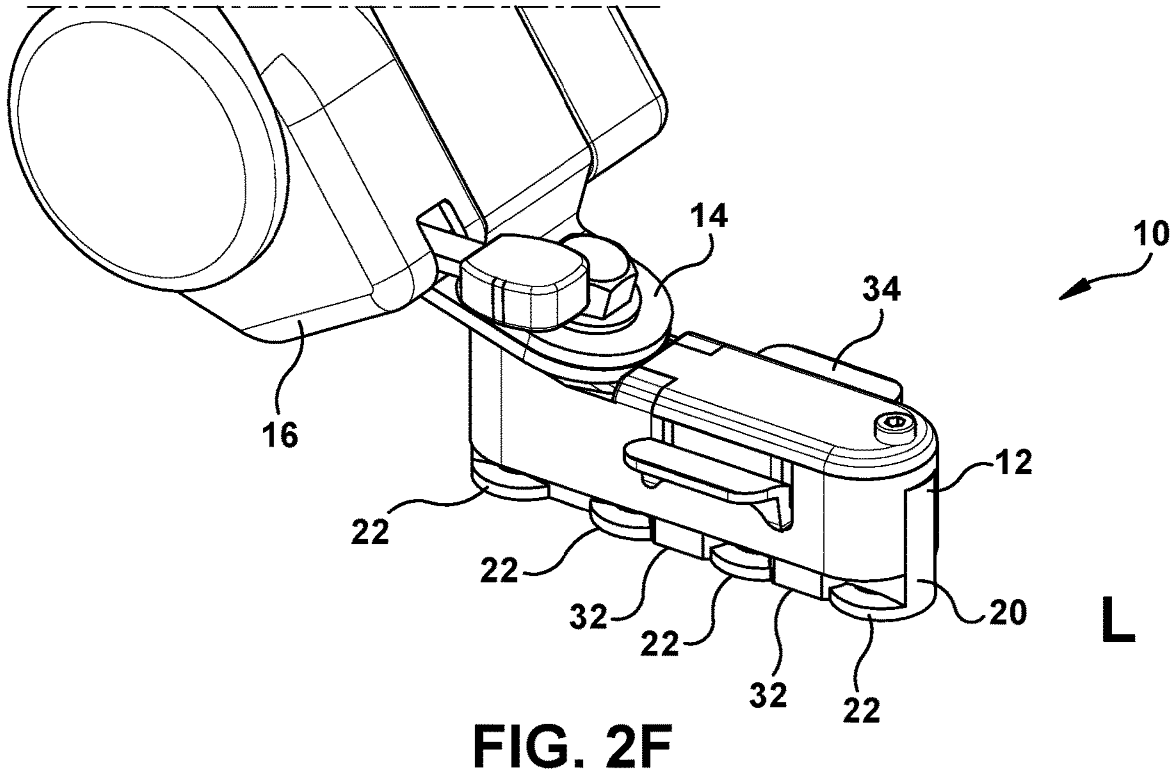
Figure 2G:
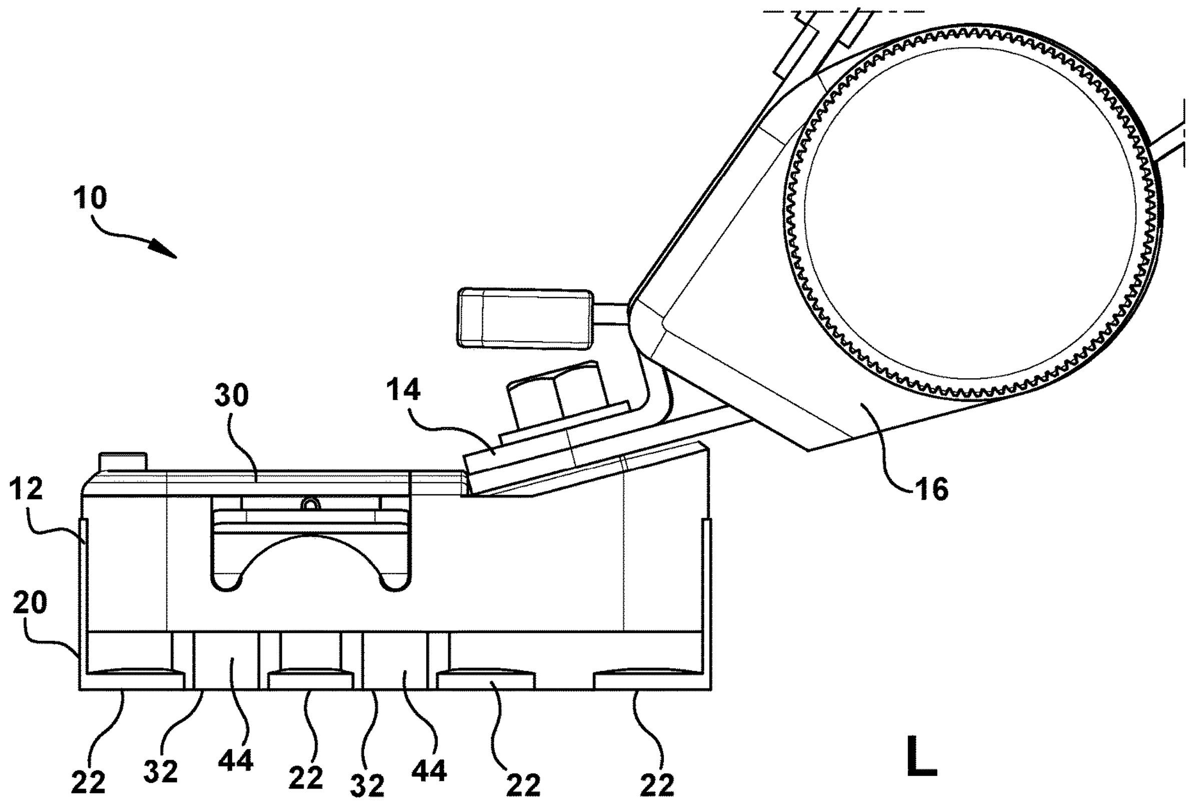
Figure 2H:
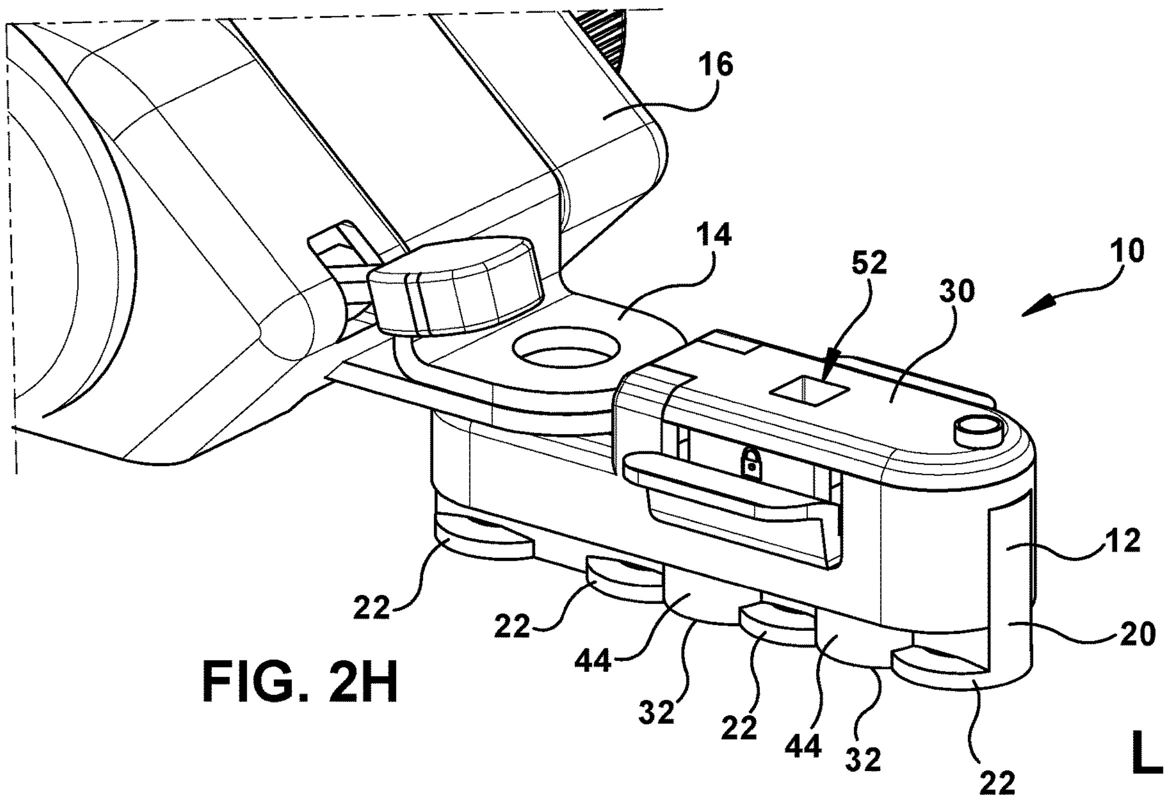
Figure 2I:
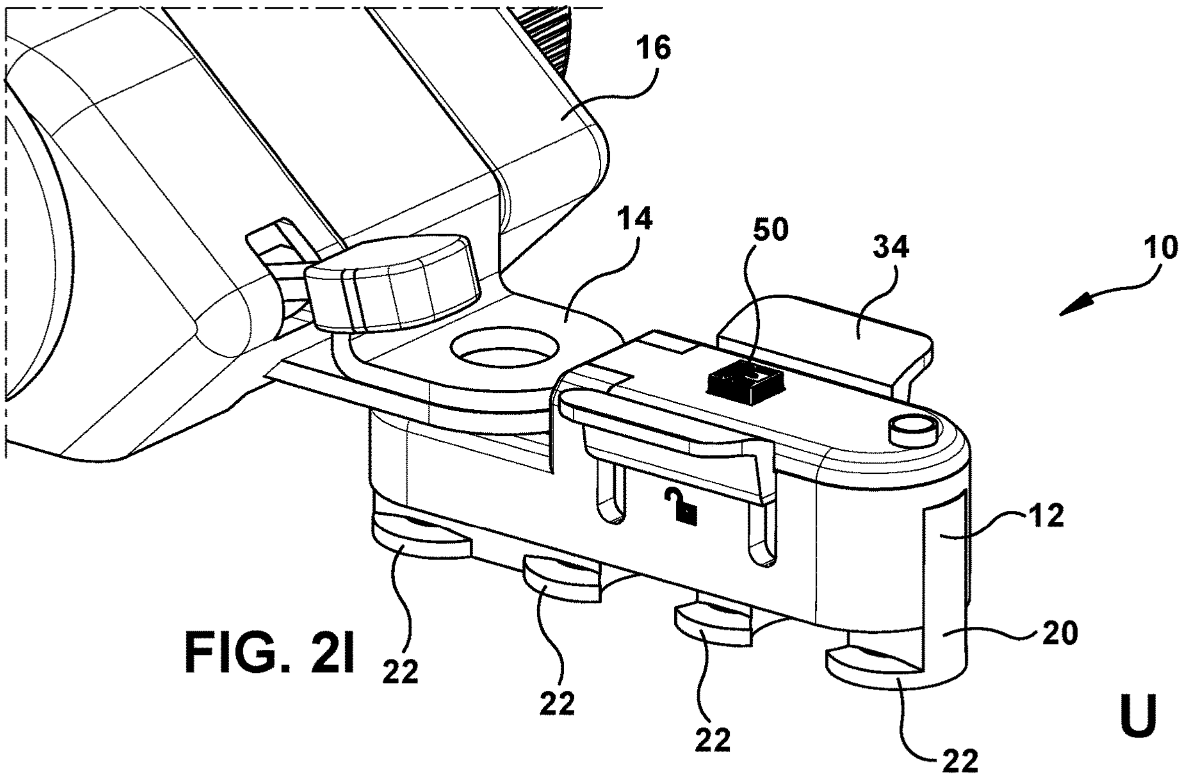
Figure 3A:
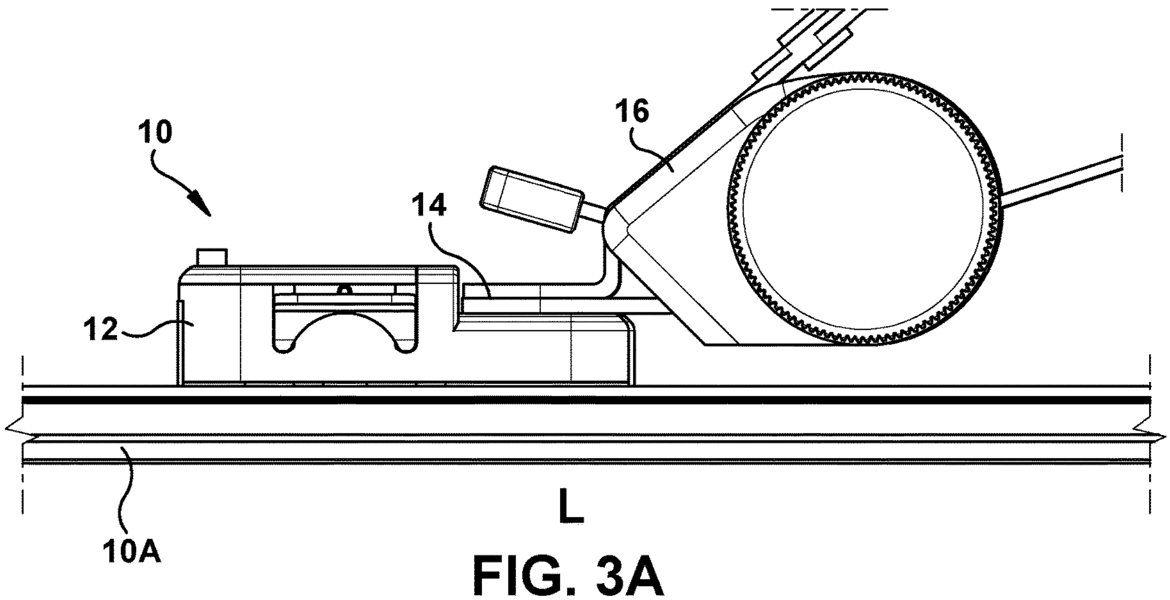
Figure 3B:
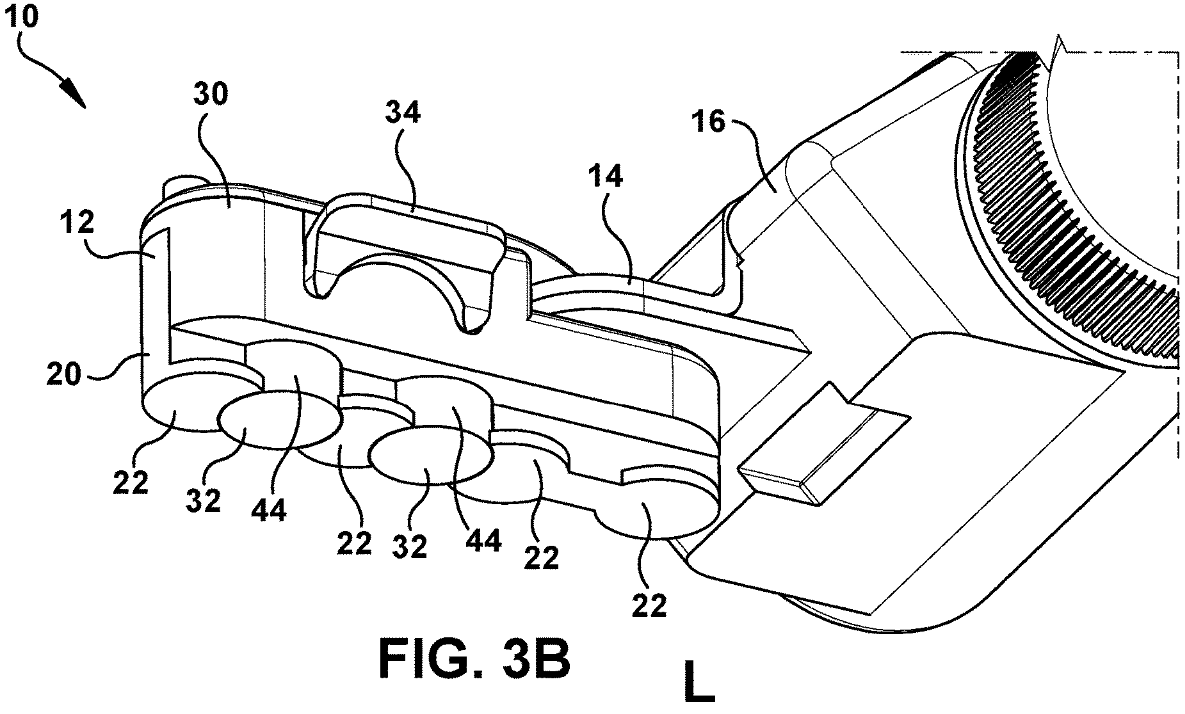
Figure 3C:
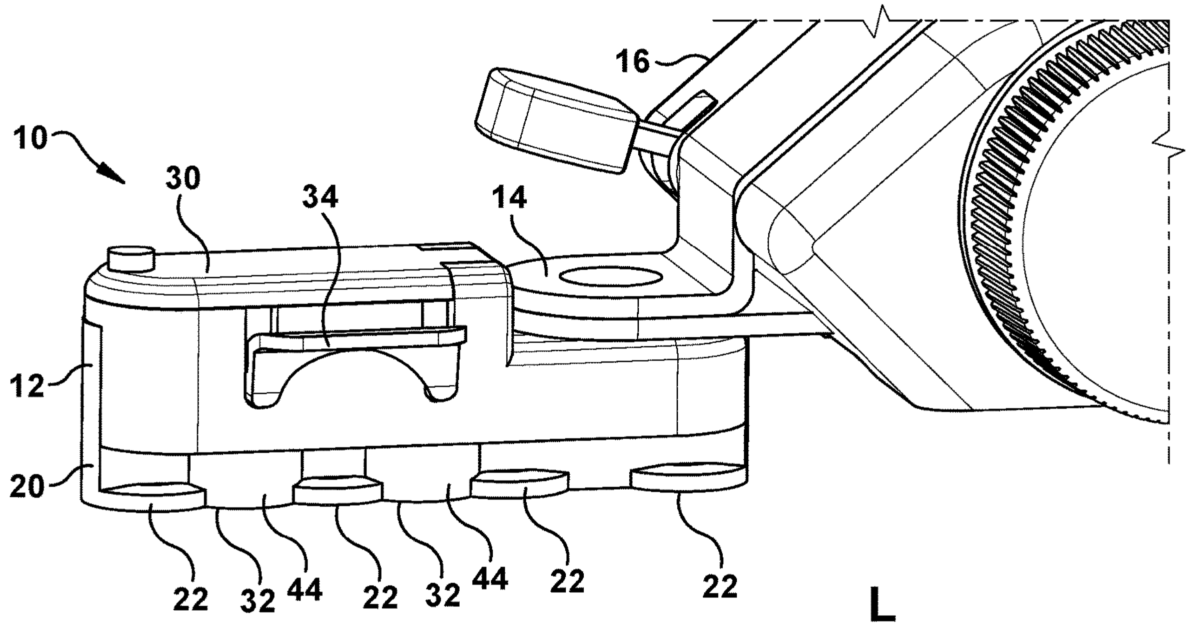
Figure 3D:
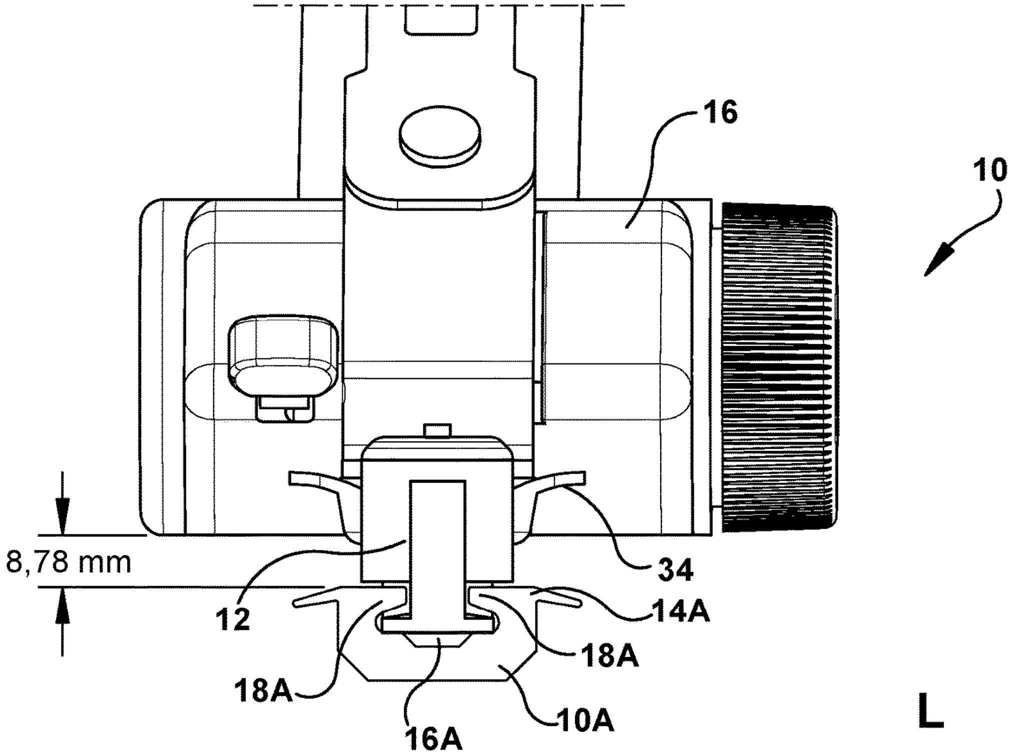
Figure 4A:
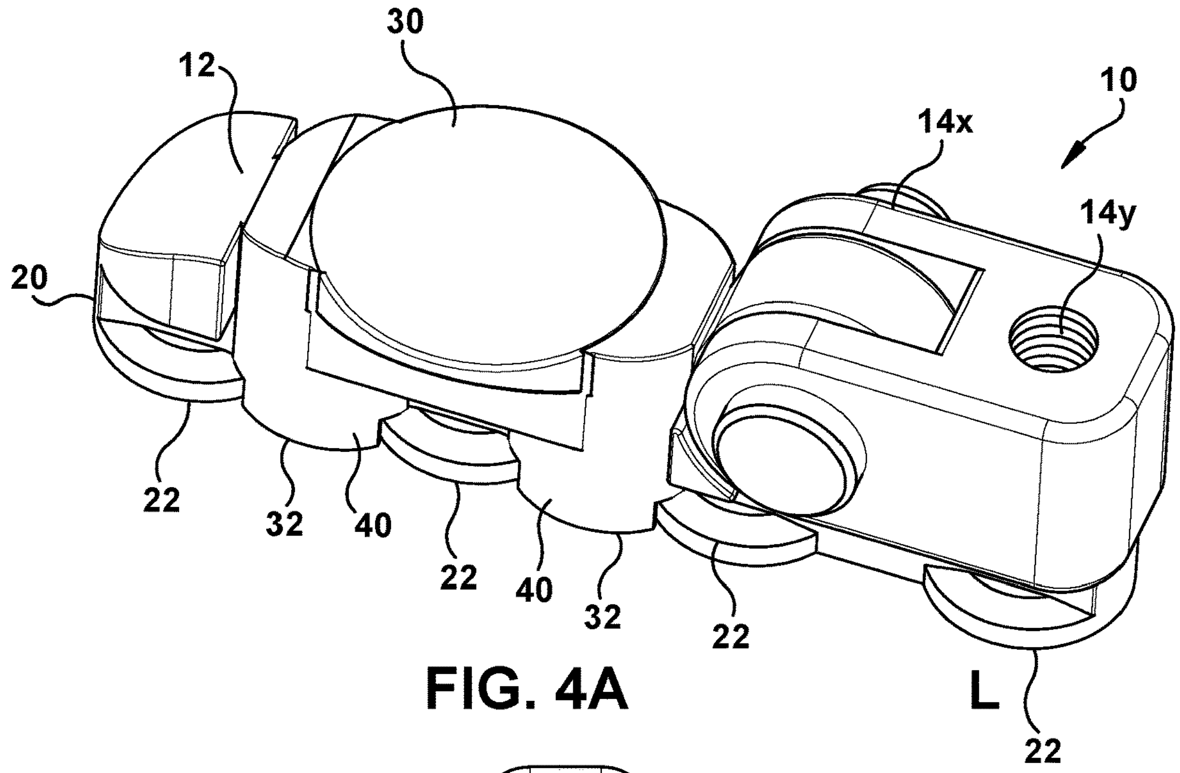
Figure 4B:
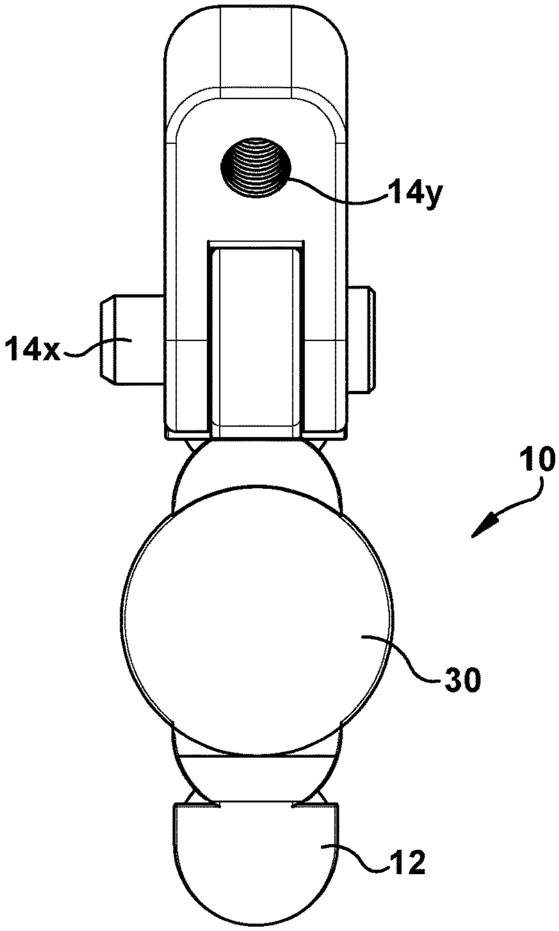
Figure 4C:
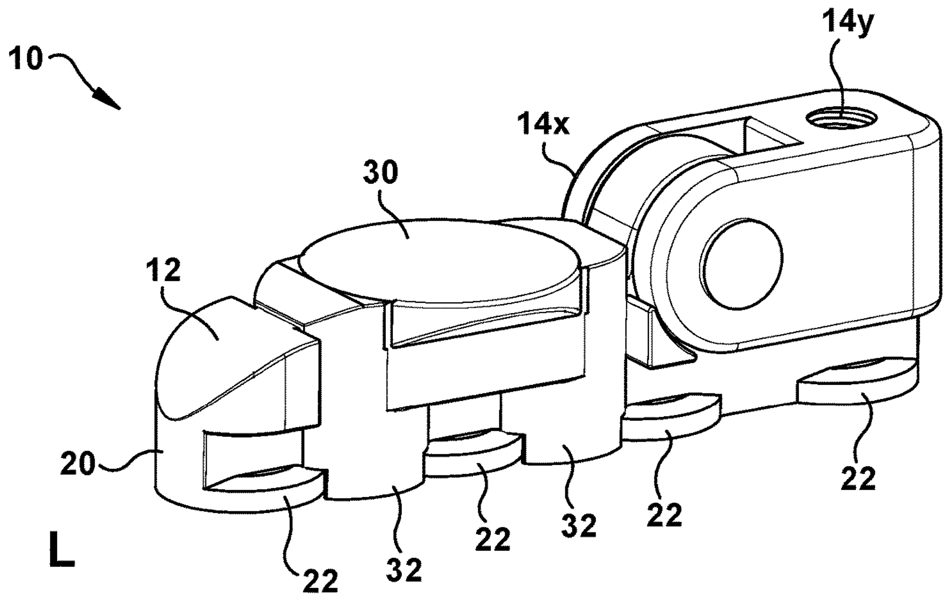
Figure 4D:
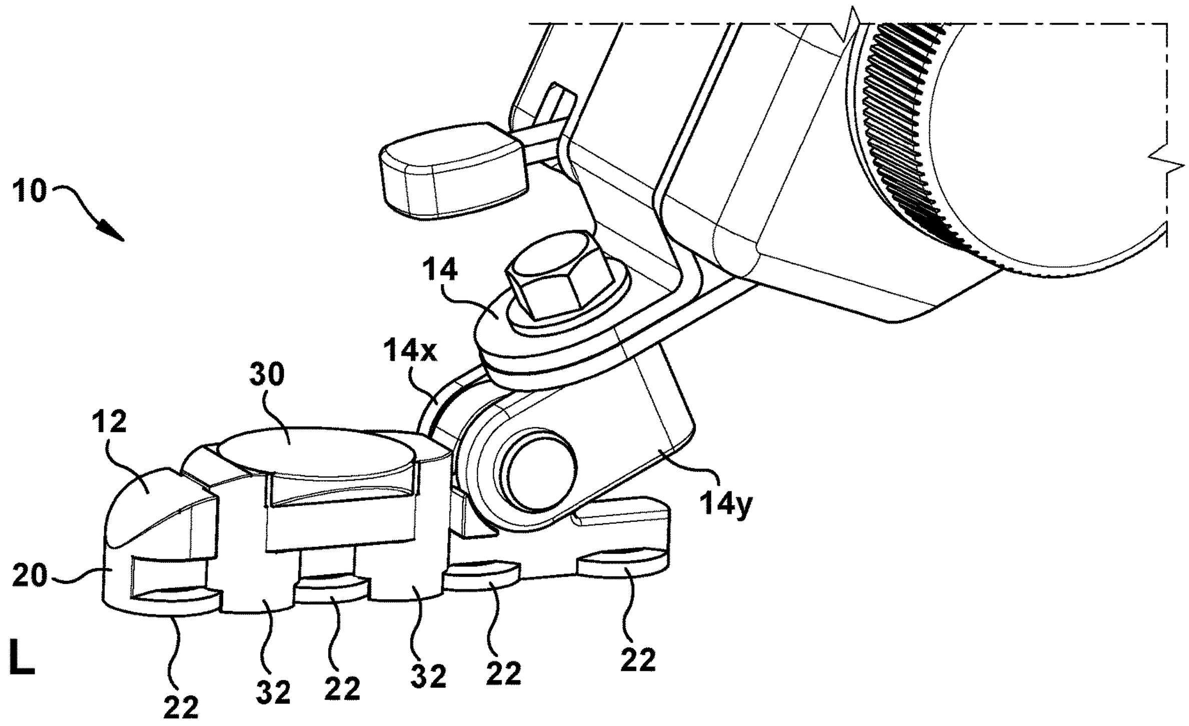
Figure 4E:
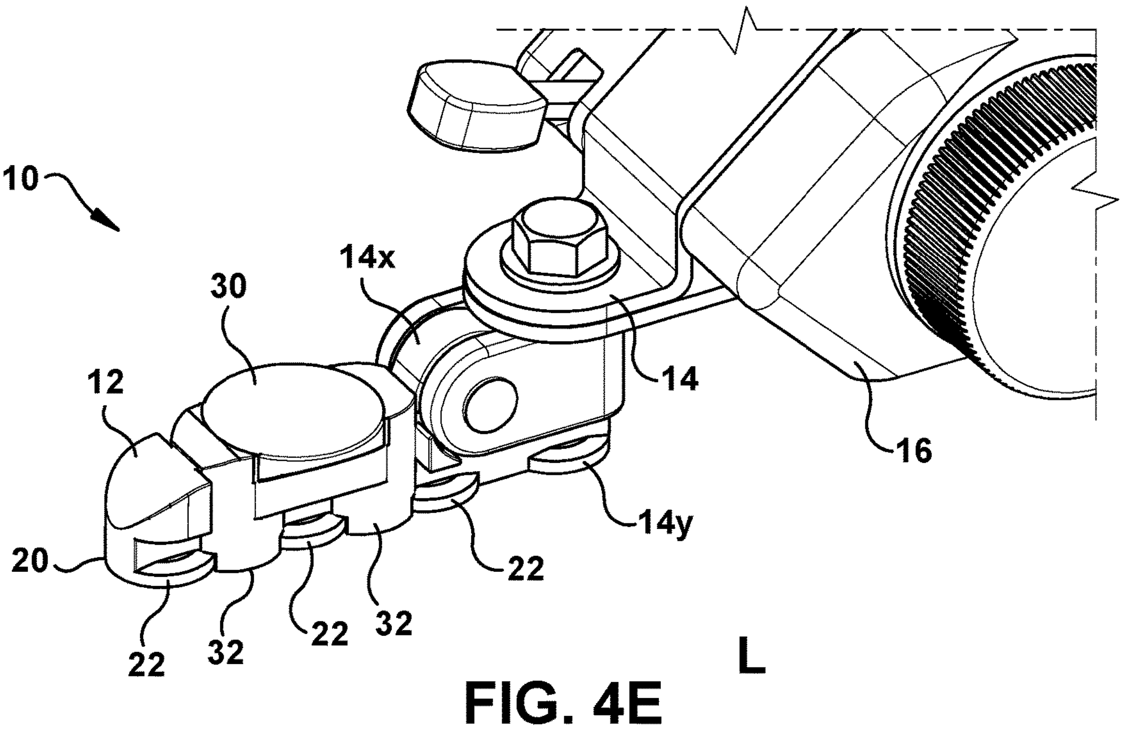
Figure 4F:
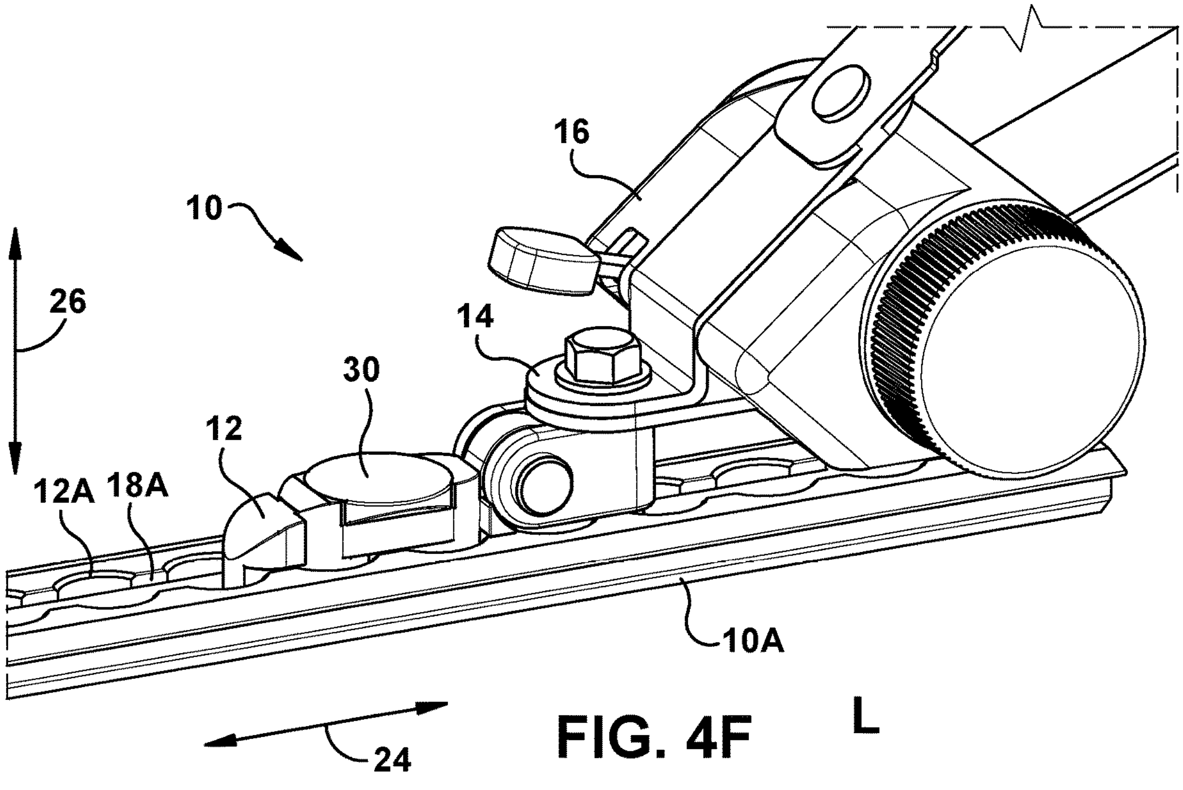
Figure 4G:
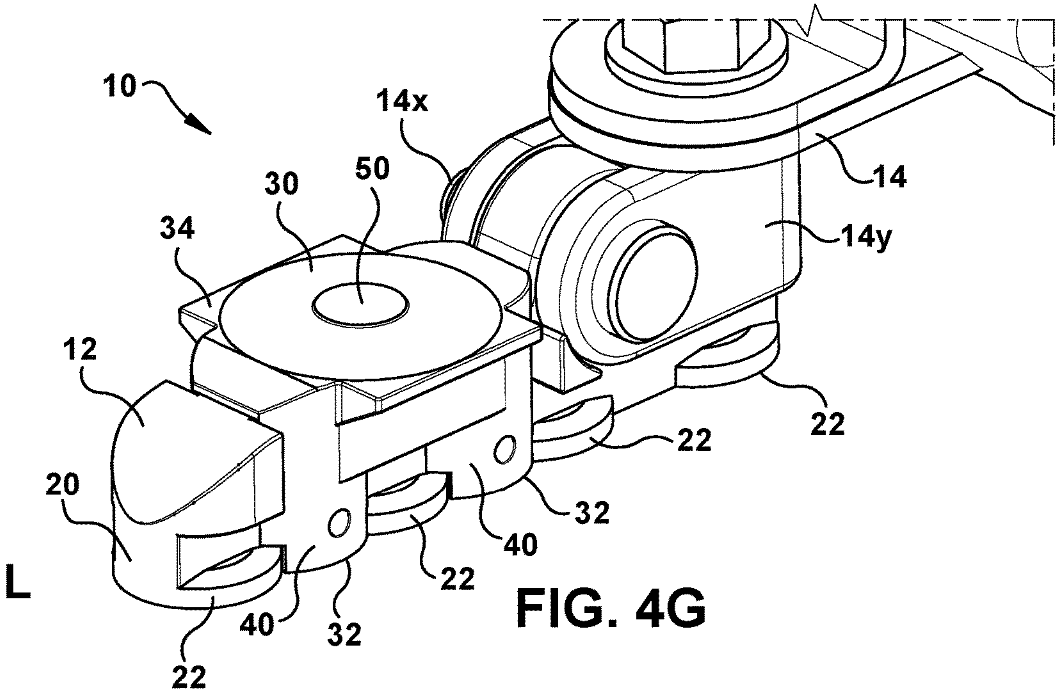
Figure 4H:
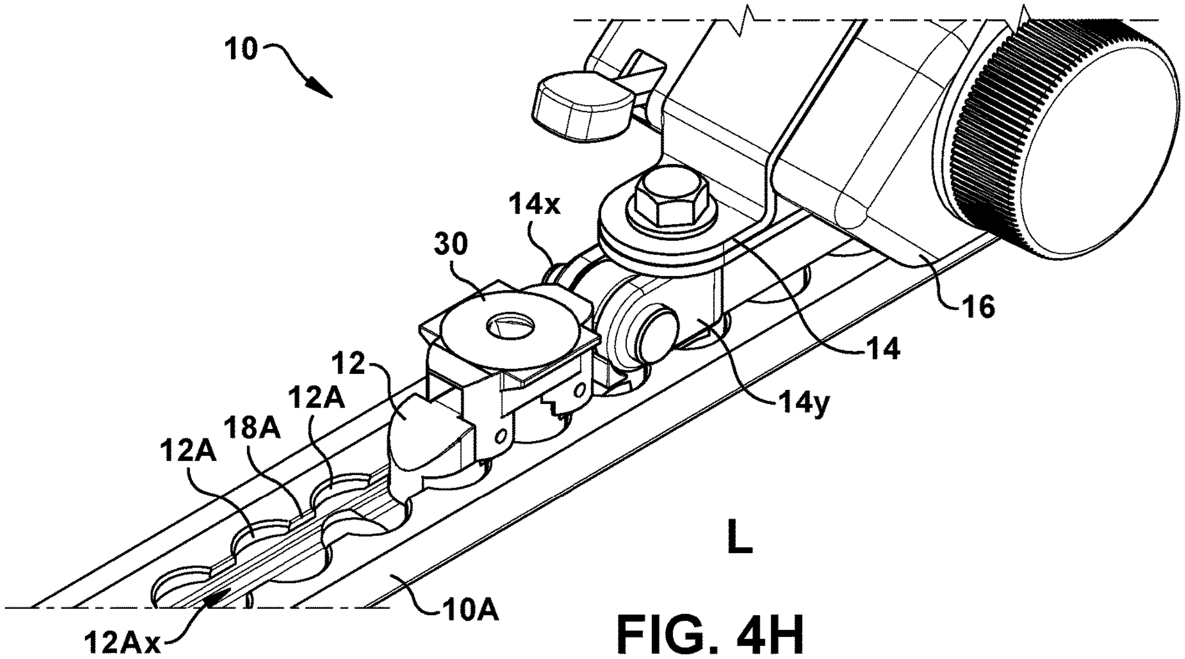
Figure 4I:
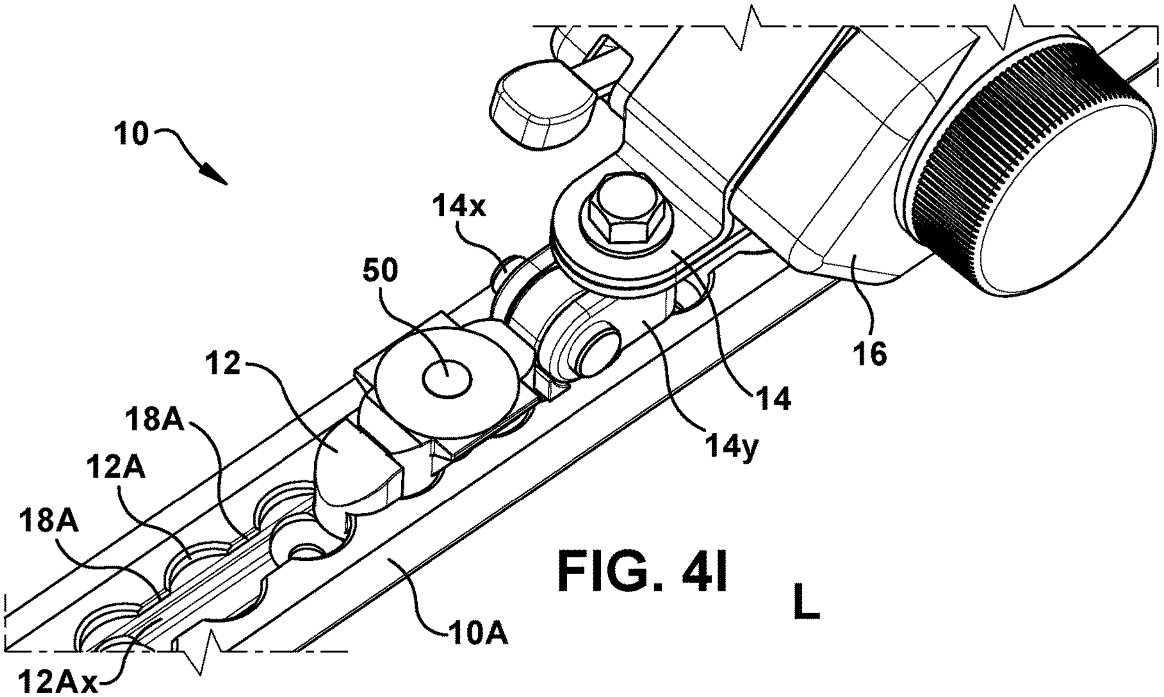
Figure 4J:
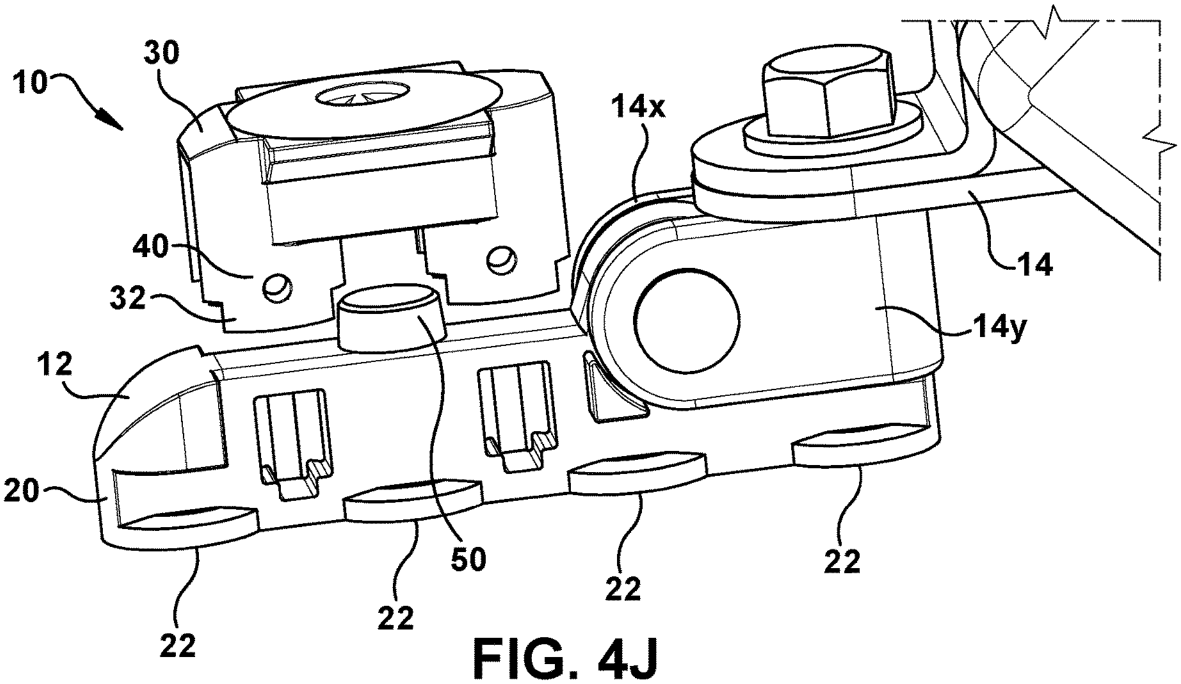
Figure 4K:
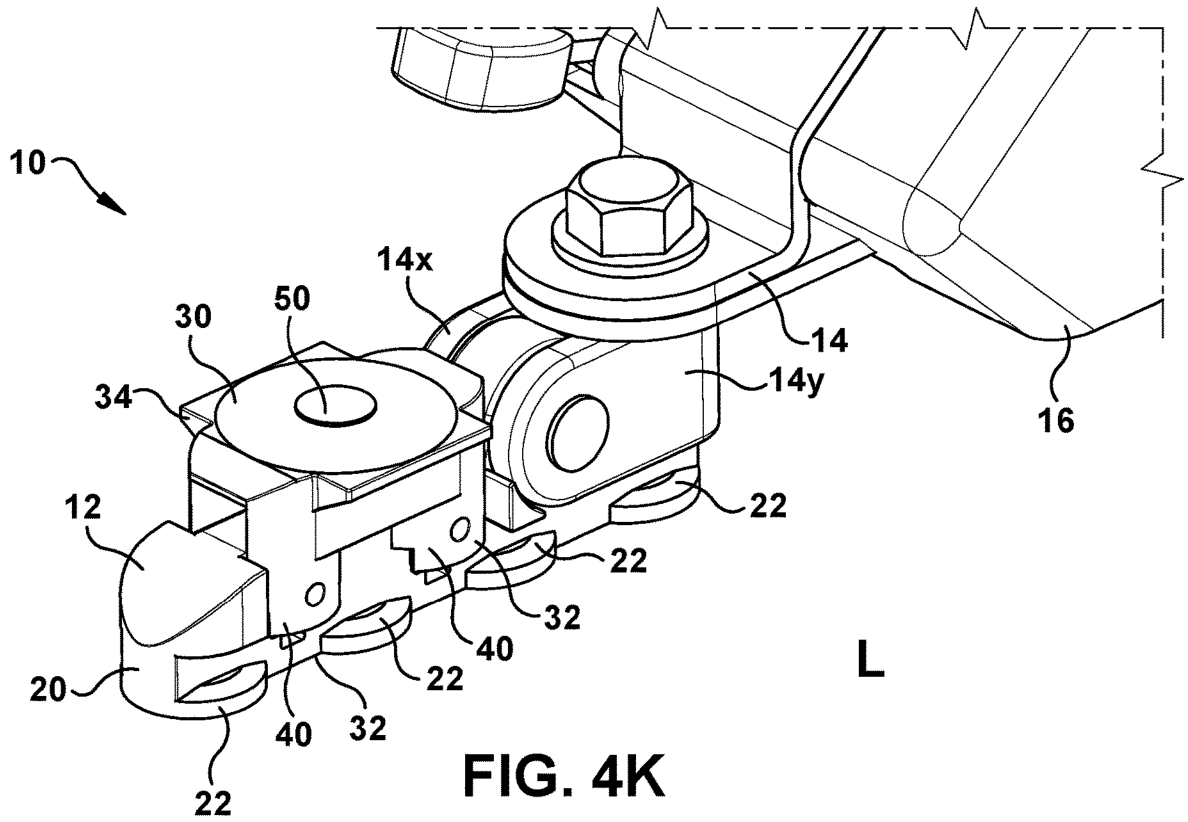
Figure 4L:
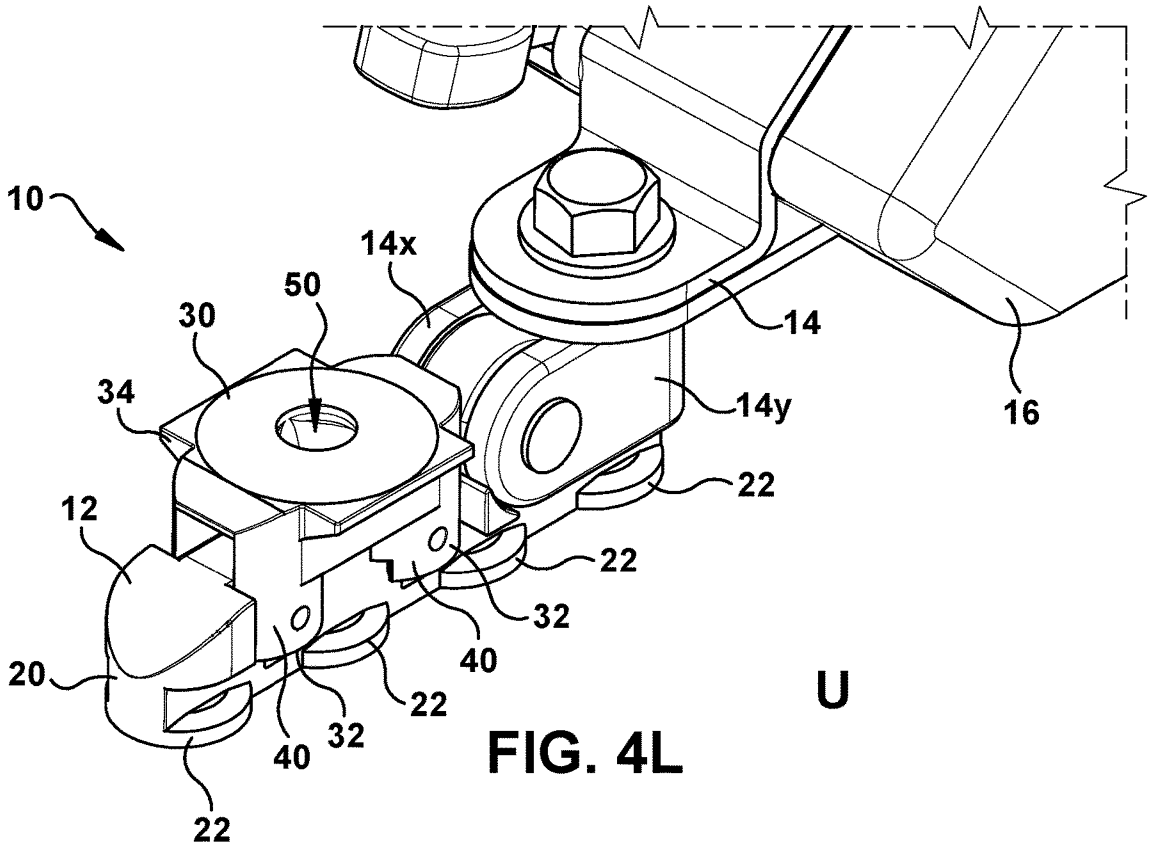

With specific reference to FIGS. 2H and 2I, an alternate aspect of the second model shows a safety lock visual indicator where the first color (i.e., of the visual pin 50) is red, and the second color (i.e., of the internal chamber 52) is green. In this alternate aspect, the visual pin 50 is configured to extend above the exterior surface of the retractable lock mechanism 30 to reveal red color and thereby indicate the unlocked position L. Alternately, when the retractable lock mechanism 30 is retracted, the visual pin 50 is then recessed below the exterior surface of the retractable lock mechanism 30 to conceal the red visual pin 50 and thereby reveal the green color within the internal chamber 52 and thereby indicate the locked position U.

With specific reference to FIGS. 2H and 2I and FIGS. 4G, 4H, 4I, 4J, 4K, and 4L, an alternate aspect of the fourth model shows a safety lock visual indicator where the first color (i.e., of the visual pin 50) is green, and the second color (i.e., of the internal chamber 52) is red. In this alternate aspect, the visual pin 50 is configured to extend above the exterior surface of the retractable lock mechanism 30 to reveal green color and thereby indicate the locked position L. Alternately, when the retractable lock mechanism 30 is retracted, the visual pin 50 is then recessed below the exterior surface of the retractable lock mechanism 30 to reveal the red color within the internal chamber 52 and thereby indicate the unlocked position L.

It is to be appreciated that the descriptions hereinabove of the safety lock visual indicators 50 shown in FIGS. 1H, 1I, 1J, and 1K, FIGS. 2H and 2I, and FIGS. 4G, 4H, 4I, 4J, 4K are given respectively for the first, second, and fourth models. However, it is contemplated that any variations could be contemplated in which any of the safety lock visual indicator alternate embodiments could be readily adapted for any of the other embodiments of the first, second, third, or fourth models, all without departing from the present innovative concept.

As generally depicted in FIGS. 1A through 4L, the present fitting assembly 10 can include a connection component 14 having a pivotal connection 14 configured to enable pivotal rotation of the fitting 12 along one or more axes each set at an angle to the longitudinal length 24. As shown in the first model and the third model, the pivotal connection 14 can be configured to enable pivotal rotation of the fitting 12 along an axis vertically perpendicular to the longitudinal length 24. The second model is shown to also have a pivotal connection configured to enable pivotal rotation of the fitting 12 along an axis vertically perpendicular to the longitudinal length 24, or it can be set at a slightly offset angle (see FIGS. 2C through 2G). Alternately, as shown in the fourth model, the pivotal connection is configured to enable pivotal rotation of the fitting 12 along an axis 14*x* transversely perpendicular to the longitudinal length 24, and also an axis 14*y* vertically perpendicular to the longitudinal length 24, so as to rotate in two dimensions with two degrees of freedom.

As shown in FIGS. 1A through 4L, the external component 16 can be a retractor body 16 configured for attachment to a retractable member, such as an adjustable strap, for securing a wheelchair against movement inside a passenger vehicle. In this manner, the present fitting assembly 10 is a component of a retractor assembly for retaining a wheelchair in a passenger vehicle. In such an embodiment, a retractor body 16 can be configured for attachment to a retractable member mounted onto a surface of the passenger vehicle, such that the retractable member is configured for securing the wheelchair against movement inside the passenger vehicle. The fitting 12 is provided for engaging an L-track 10A mounted to a floor surface of the passenger vehicle. A pivotal connection 14 is provided for pivotally connecting the retractor body to the fitting 12. The fitting 12 includes the bottom portion 20 including the row of circular disks 22 configured to be received within the corresponding row of circular apertures 12A formed in a surface of the L-track 10A. The fitting 12 is configured to slide along the longitudinal length 24 of the L-track 10A to enable the circular discs 22 to be retained within the channel 16A beneath the opposing ledges formed in the surface of the L-track. The fitting 12 also includes the retractable lock mechanism 30 configured to retract along the fitting 12 in the direction 26 perpendicular to the longitudinal length 24, retracting between the locked position L and the unlocked position U. The retractable lock mechanism 30 also includes the circular engagement portions 32 for engaging the circular apertures 12A of the L-track 10A when in the locked position L, to thereby prevent the fitting 12 from sliding along the longitudinal length L.

In the present first model, the retractor 16 mounts on the middle of the body of the fitting 12 instead of the rear of the fitting assembly 10. This model portion of the fitting assembly 10 is underneath the retractor 16 which saves much-needed space in smaller vehicles or any vehicle transporting larger wheelchairs. The safety lock visual pin 50 does not compromise the strength of the fitting assembly 10 of this aspect nor the operation of the fitting assembly 10 and since it is included in the casting, so no additional pins or springs are necessary.

In the present second model, the retractor 16 mounts on an angle, so with this model a plunger (i.e., cylindrical member) and two springs are enclosed internally, held captive by a metal cover and screw, thus eliminating roll pins to hold the plunger in place. The plunger travels up and down inside the body casting of the fitting 12, so the two plunger studs (i.e., cylindrical members) are semi round and solid shape this increase the strength of the plunger. In this embodiment the safety lock visual pin 50 extends through the top cover.

In the present third model, the retractor 16 is mounted at the rear of the of the body of the fitting 12. This location of the fitting 12 allows the retractor 16 to be as close to the floor and possible, so that the whole assembly is very low profile. This model of the fitting assembly 10 is designed and assembled similar to the second model including a safety lock visual pin 50 through the top cover.

In the present fourth model, the retractor 16 is mounted to a separate casting which attaches to the main body of the fitting 12 by a metal shaft which swivels up and down, giving multiple angles from the pivot point of the fitting 12 to the wheelchair. This angle will change based on the location of the attachment on the wheelchair(s). In this embodiment, the safety lock visual pin 50 is through the plunger.

Clause 1—A fitting assembly including a fitting for engaging an L-track mounted to a surface, a connection component for connecting the fitting to an external component, wherein the fitting includes a bottom portion including a row of circular disks configured to be received within a corresponding row of circular apertures formed in a surface of the L-track, wherein the fitting is configured to slide along a longitudinal length of the L-track to enable the circular discs to be retained within a channel beneath opposing ledges formed in the surface of the L-track and a retractable lock mechanism configured to retract along the fitting in a direction perpendicular to the longitudinal length, retracting between a locked position and an unlocked position, and having circular engagement portions for engaging the circular apertures of the L-track when in the locked position, to thereby prevent the fitting from sliding along the longitudinal length.

Clause 2—The fitting assembly of clause 1, wherein the retractable lock mechanism further comprises at least one tab projecting from at least one side of the retractable lock mechanism, to enable manual gripping of the retractable lock mechanism for retracting between the locked position and the unlocked position.

Clause 3—The fitting assembly of clauses 1 and 2, wherein the retractable lock mechanism further comprises cylindrical members configured to retractably move inside cylindrical bores formed within the fitting, wherein the circular engagement portions are formed at respective bottom ends of the cylindrical members.

Clause 4—The fitting assembly of Clauses 1-3, wherein the retractable lock mechanism is defined by a solid top portion with a pair of the cylindrical members connected thereto, which extend moveably into a respective pair of the cylindrical bores.

Clause 5—The fitting assembly of clauses 1-4, wherein the retractable lock mechanism further comprises partial cylindrical members having hollow central portions configured to retractably move outside a flat central body portion of the fitting, wherein the circular engagement portions are partial circular sections formed at respective bottom ends of the partial cylindrical members.

Clause 6—The fitting assembly of clauses 1-5, wherein the retractable lock mechanism is defined by a solid top portion with a pair of bifurcated partial cylindrical members connected thereto, which extend moveably along an outside surface of the flat central body portion.

Clause 7—The fitting assembly of clauses 1-6, further including a safety lock visual indicator for visibly indicating whether the retractable lock mechanism is in the locked position or the unlocked position.

Clause 8—The fitting assembly of clauses 1-7, wherein the safety lock visual indicator comprises visible indicia partially formed onto sections of both the fitting and the retractable lock mechanism such that, when in the locked position, the visual indicia of both sections are in alignment to appear as complete and continuous visual indicia, and when in the unlocked position, the visual indicia of both sections are out of alignment to appear as incomplete and discontinuous visual indicia.

Clause 9—The fitting assembly of clauses 1-8, wherein the safety lock visual indicator is a visual pin having a first color and is received within an internal chamber of the retractable lock mechanism having a second color, wherein the visual pin extends above an exterior surface of the retractable lock mechanism to reveal the first color and thereby indicate one of the locked position or unlocked position, and wherein the visual pin is alternately recessed below the exterior surface of the retractable lock mechanism within the internal chamber to reveal the second color of the internal chamber and thereby indicate the respective other of the locked position or unlocked position.

Clause 10—The fitting assembly of clauses 1-9, wherein the first color is red, and the second color is green, wherein the visual pin is configured to extend above the exterior surface of the retractable lock mechanism to reveal red color and thereby indicate the unlocked position, and wherein the visual pin is alternately recessed below the exterior surface of the retractable lock mechanism to reveal green color within the internal chamber and thereby indicate the locked position.

Clause 11—The fitting assembly of clauses 1-10, wherein the first color is green, and the second color is red, wherein the visual pin is configured to extend above the exterior surface of the retractable lock mechanism to reveal green color and thereby indicate the locked position, and wherein the visual pin is alternately recessed below the exterior surface of the retractable lock mechanism to reveal red color within the internal chamber and thereby indicate the unlocked position.

Clause 12—The fitting assembly of clause 1-11, wherein the connection component comprises a pivotal connection configured to enable pivotal rotation of the fitting along at least one axis set at an angle to the longitudinal length.

Clause 13—The fitting assembly of clauses 1-12, wherein the pivotal connection is configured to enable pivotal rotation of the fitting along an axis transversely perpendicular to the longitudinal length.

Clause 14—The fitting assembly of clauses 1-13, wherein the pivotal connection is configured to enable pivotal rotation of the fitting along an axis vertically perpendicular to the longitudinal length.

Clause 15—The fitting assembly of clauses 1-14, wherein the fitting assembly is external component is a retractor body configured for attachment to a retractable member, for securing a wheelchair against movement inside a passenger vehicle.

Clause 16—A retractor assembly for retaining a wheelchair in a passenger vehicle including a retractor body configured for attachment to a retractable member mounted onto a surface of the passenger vehicle, wherein the retractable member is configured for securing the wheelchair against movement inside the passenger vehicle, a fitting for engaging an L-track mounted to a floor surface of the passenger vehicle, a pivotal connection for pivotally connecting the retractor body to the fitting, wherein the fitting includes a bottom portion including a row of circular disks configured to be received within a corresponding row of circular apertures formed in a surface of the L-track, wherein the fitting is configured to slide along a longitudinal length of the L-track to enable the circular discs to be retained within a channel beneath opposing ledges formed in the surface of the L-track, and a retractable lock mechanism configured to retract along the fitting in a direction perpendicular to the longitudinal length, retracting between a locked position and an unlocked position, and having circular engagement portions for engaging the circular apertures of the L-track when in the locked position, to thereby prevent the fitting from sliding along the longitudinal length.

Clause 17—The retractor assembly of clause 16, wherein the retractable lock mechanism further comprises at least one tab projecting from at least one side of the retractable lock mechanism, to enable manual gripping of the retractable lock mechanism for retracting between the locked position and the unlocked position.

Clause 18—The retractor assembly of clauses 16 or 17, wherein the retractable lock mechanism further comprises cylindrical members configured to retractably move inside cylindrical bores formed within the fitting, wherein the circular engagement portions are formed at respective bottom ends of the cylindrical members.

Clause 19—The retractor assembly of any of clauses 16-18, wherein the retractable lock mechanism is defined by a solid top portion with a pair of the cylindrical members connected thereto, which extend moveably into a respective pair of the cylindrical bores.

Clause 20—The retractor assembly of any of clauses 16-19, wherein the retractable lock mechanism further comprises partial cylindrical members having hollow central portions configured to retractably move outside a flat central body portion of the fitting, wherein the circular engagement portions are partial circular sections formed at respective bottom ends of the partial cylindrical members.

Numerous aspects have been described herein. It will be apparent to those skilled in the art that the above methods and apparatuses may incorporate changes and modifications without departing from the general scope of the present teaching. It is intended to include all such modifications and alterations in so far as they come within the scope of the appended claims or the equivalents thereof.

Having thus described the present teaching, it is now claimed:

What is claimed:

1. A fitting assembly, comprising:

a fitting for engaging an L-track mounted to a surface;

a connection component for connecting the fitting to an external component;

wherein the fitting comprises:

a bottom portion including a row of circular disks configured to be received within a corresponding row of circular apertures formed in a surface of the L-track, wherein the fitting is configured to slide along a longitudinal length of the L-track to enable the circular discs to be retained within a channel beneath opposing ledges formed in the surface of the L-track; and a retractable lock mechanism configured to retract along the fitting in a direction perpendicular to the longitudinal length, retracting between a locked position and an unlocked position, and having circular engagement portions for engaging the circular apertures of the L-track when in the locked position, to thereby prevent the fitting from sliding along the longitudinal length, wherein the retractable lock mechanism further comprises partial cylindrical members having hollow central portions configured to retractably move outside a flat central body portion of the fitting, wherein the circular engagement portions are partial circular sections formed at respective bottom ends of the partial cylindrical members.

2. The fitting assembly of claim 1, wherein the retractable lock mechanism further comprises at least one tab projecting from at least one side of the retractable lock mechanism, to enable manual gripping of the retractable lock mechanism for retracting between the locked position and the unlocked position.

3. The fitting assembly of claim 1, wherein the retractable lock mechanism further comprises cylindrical members configured to retractably move inside cylindrical bores formed within the fitting, wherein the circular engagement portions are formed at respective bottom ends of the cylindrical members.

4. The fitting assembly of claim 3, wherein the retractable lock mechanism is defined by a solid top portion with a pair of the cylindrical members connected thereto, which extend moveably into a respective pair of the cylindrical bores.

5. The fitting assembly of claim 1, wherein the retractable lock mechanism is defined by a solid top portion with a pair of bifurcated partial cylindrical members connected thereto, which extend moveably along an outside surface of the flat central body portion.

6. The fitting assembly of claim 1, further comprising a safety lock visual indicator for visibly indicating whether the retractable lock mechanism is in the locked position or the unlocked position.

7. The fitting assembly of claim 6, wherein the safety lock visual indicator comprises visible indicia partially formed onto sections of both the fitting and the retractable lock mechanism such that, when in the locked position, the visual indicia of both sections are in alignment to appear as complete and continuous visual indicia, and when in the unlocked position, the visual indicia of both sections are out of alignment to appear as incomplete and discontinuous visual indicia.

8. The fitting assembly of claim 6, wherein the safety lock visual indicator is a visual pin having a first color and is received within an internal chamber of the retractable lock mechanism having a second color, wherein the visual pin extends above an exterior surface of the retractable lock mechanism to reveal the first color and thereby indicate one of the locked position or unlocked position, and wherein the visual pin is alternately recessed below the exterior surface of the retractable lock mechanism within the internal chamber to reveal the second color of the internal chamber and thereby indicate the respective other of the locked position or unlocked position.

9. The fitting assembly of claim 8, wherein the first color is red, and the second color is green, wherein the visual pin is configured to extend above the exterior surface of the retractable lock mechanism to reveal red color and thereby indicate the unlocked position, and wherein the visual pin is alternately recessed below the exterior surface of the retractable lock mechanism to reveal green color within the internal chamber and thereby indicate the locked position.

10. The fitting assembly of claim 8, wherein the first color is green, and the second color is red, wherein the visual pin is configured to extend above the exterior surface of the retractable lock mechanism to reveal green color and thereby indicate the locked position, and wherein the visual pin is alternately recessed below the exterior surface of the retractable lock mechanism to reveal red color within the internal chamber and thereby indicate the unlocked position.

11. The fitting assembly of claim 1, wherein the connection component comprises a pivotal connection configured to enable pivotal rotation of the fitting along at least one axis set at an angle to the longitudinal length.

12. The fitting assembly of claim 11, wherein the pivotal connection is configured to enable pivotal rotation of the fitting along an axis transversely perpendicular to the longitudinal length.

13. The fitting assembly of claim 11, wherein the pivotal connection is configured to enable pivotal rotation of the fitting along an axis vertically perpendicular to the longitudinal length.

14. The fitting assembly of claim 1, wherein the fitting is a retractor body configured for attachment to a retractable member, for securing a wheelchair against movement inside a passenger vehicle.

15. A retractor assembly for retaining a wheelchair in a passenger vehicle, comprising:

a retractor body configured for attachment to a retractable member mounted onto a surface of the passenger vehicle, wherein the retractable member is configured for securing the wheelchair against movement inside the passenger vehicle;

a fitting for engaging an L-track mounted to a floor surface of the passenger vehicle;

a pivotal connection for pivotally connecting the retractor body to the fitting;

wherein the fitting comprises:

a bottom portion including a row of circular disks configured to be received within a corresponding row of circular apertures formed in a surface of the L-track, wherein the fitting is configured to slide along a longitudinal length of the L-track to enable the circular discs to be retained within a channel beneath opposing ledges formed in the surface of the L-track; and a retractable lock mechanism configured to retract along the fitting in a direction perpendicular to the longitudinal length, retracting between a locked position and an unlocked position, and having circular engagement portions for engaging the circular apertures of the L-track when in the locked position, to thereby prevent the fitting from sliding along the longitudinal length, wherein the retractable lock mechanism further comprises cylindrical members configured to retractably move inside cylindrical bores formed within the fitting, wherein the circular engagement portions are formed at respective bottom ends of the cylindrical members, wherein the retractable lock mechanism is defined by a solid top portion with a pair of the cylindrical members connected thereto, which extend moveably into a respective pair of the cylindrical bores.

16. The retractor assembly of claim 15, wherein the retractable lock mechanism further comprises at least one tab projecting from at least one side of the retractable lock mechanism, to enable manual gripping of the retractable lock mechanism for retracting between the locked position and the unlocked position.

17. The retractor assembly of claim 15, wherein the retractable lock mechanism further comprises partial cylindrical members having hollow central portions configured to retractably move outside a flat central body portion of the fitting, wherein the circular engagement portions are partial circular sections formed at respective bottom ends of the partial cylindrical members.

* * * * *